(12) United States Patent
Maciocco et al.

(10) Patent No.: US 7,848,649 B2
(45) Date of Patent: Dec. 7, 2010

(54) METHOD AND SYSTEM TO FRAME AND FORMAT OPTICAL CONTROL AND DATA BURSTS IN WDM-BASED PHOTONIC BURST SWITCHED NETWORKS

(75) Inventors: Christian Maciocco, Tigard, OR (US); Shlomo Ovadia, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 1877 days.

(21) Appl. No.: 10/377,580

(22) Filed: Feb. 28, 2003

(65) Prior Publication Data
US 2004/0170165 A1 Sep. 2, 2004

(51) Int. Cl.
*H04J 14/00* (2006.01)
*H04L 12/28* (2006.01)

(52) U.S. Cl. .............. 398/51; 398/48; 398/49; 398/50; 398/54; 398/66; 398/68; 398/79; 398/89; 398/43; 398/45

(58) Field of Classification Search ............ 398/43, 398/45, 48–51, 66, 68, 79, 89
See application file for complete search history.

(56) References Cited

U.S. PATENT DOCUMENTS

| | | | |
|---|---|---|---|
| 4,663,748 A | 5/1987 | Karbowiak et al. |
| 5,235,592 A | 8/1993 | Cheng et al. |
| 5,331,642 A | 7/1994 | Valley et al. |
| 5,457,556 A | 10/1995 | Shiragaki |
| 5,506,712 A | 4/1996 | Sasayama et al. |
| 5,550,803 A | 8/1996 | Crayford et al. |
| 5,559,796 A | 9/1996 | Edem et al. |

(Continued)

FOREIGN PATENT DOCUMENTS

CN 1384618 12/2002

(Continued)

OTHER PUBLICATIONS

I. Baldine, "Jumpstart: A Just-in-Time Signaling Architecture for WDM Burst-Switched Networks," IEEE Commun. Mag., vol. 40, No. 2, pp. 82-89, Feb. 2002.*

(Continued)

*Primary Examiner*—Kenneth N Vanderpuye
*Assistant Examiner*—Danny W Leung
(74) *Attorney, Agent, or Firm*—Blakely, Sokoloff, Taylor & Zafman LLP

(57) ABSTRACT

A wavelength-division-multiplexed based photonic burst switched (PBS) network, which includes edge and switching nodes, optically communicate information formatted into PBS control and data burst frames. Each PBS data burst frame is associated with a PBS control burst frame. A PBS burst frame includes a PBS burst header and burst payload having fields to indicate whether: (a) the PBS burst frame is a PBS control burst; (b) the control burst is transmitted on a wavelength different from that of the associated PBS data burst; and (c) the PBS burst frame has a label for use in a generalized multi-protocol label swapping (GMPLS)-based control system. The PBS burst payload frame includes fields to indicate (a) specific PBS payload information; (b) PBS data payload; and (c) an optional PBS payload frame check sequence (FCS) for error detection.

56 Claims, 11 Drawing Sheets

U.S. PATENT DOCUMENTS

| | | | |
|---|---|---|---|
| 5,646,943 | A | 7/1997 | Elwalid |
| 5,768,274 | A * | 6/1998 | Murakami et al. ......... 370/395.7 |
| 5,838,663 | A | 11/1998 | Elwalid et al. |
| 5,970,050 | A | 10/1999 | Johnson |
| 5,978,356 | A | 11/1999 | Elwalid et al. |
| 6,111,673 | A | 8/2000 | Chang et al. |
| 6,222,839 | B1 | 4/2001 | Nakazaki et al. |
| 6,260,155 | B1 | 7/2001 | Dellacona |
| 6,271,946 | B1 | 8/2001 | Chang et al. |
| 6,272,117 | B1 | 8/2001 | Choi et al. |
| 6,325,636 | B1 | 12/2001 | Hipp et al. |
| 6,339,488 | B1 | 1/2002 | Beshai et al. |
| 6,400,863 | B1 | 6/2002 | Weinstock et al. |
| 6,411,506 | B1 | 6/2002 | Hipp et al. |
| 6,466,586 | B1 | 10/2002 | Darveau et al. |
| 6,487,686 | B1 | 11/2002 | Yamazaki et al. |
| 6,490,292 | B1 | 12/2002 | Matsuzawa |
| 6,498,667 | B1 | 12/2002 | Masucci et al. |
| 6,519,062 | B1 | 2/2003 | Yoo |
| 6,519,255 | B1 | 2/2003 | Graves |
| 6,525,850 | B1 | 2/2003 | Chang et al. |
| 6,542,499 | B1 | 4/2003 | Murphy et al. |
| 6,545,781 | B1 | 4/2003 | Chang et al. |
| 6,603,893 | B1 | 8/2003 | Liu et al. |
| 6,615,382 | B1 | 9/2003 | Kang et al. |
| 6,665,495 | B1 | 12/2003 | Miles et al. |
| 6,671,256 | B1 * | 12/2003 | Xiong et al. ................. 370/230 |
| 6,674,558 | B1 | 1/2004 | Chang et al. |
| 6,690,036 | B2 | 2/2004 | Liu et al. |
| 6,697,374 | B1 | 2/2004 | Shraga et al. |
| 6,721,271 | B1 | 4/2004 | Beshai et al. |
| 6,721,315 | B1 | 4/2004 | Xiong et al. |
| 6,839,322 | B1 | 1/2005 | Smith |
| 6,842,424 | B1 | 1/2005 | Key et al. |
| 6,873,797 | B2 | 3/2005 | Chang et al. |
| 6,898,205 | B1 | 5/2005 | Chaskar et al. |
| 6,925,257 | B2 * | 8/2005 | Yoo ............................ 398/47 |
| 6,940,863 | B2 | 9/2005 | Xue et al. |
| 6,956,868 | B2 | 10/2005 | Qiao |
| 6,987,770 | B1 | 1/2006 | Yonge, III |
| 6,990,071 | B2 | 1/2006 | Adam et al. |
| 7,023,846 | B1 | 4/2006 | Andersson et al. |
| 7,035,537 | B2 | 4/2006 | Wang et al. |
| 7,092,633 | B2 | 8/2006 | Fumagalli et al. |
| 7,106,968 | B2 | 9/2006 | Lahav et al. |
| 2002/0018263 | A1 | 2/2002 | Ge et al. |
| 2002/0018468 | A1 | 2/2002 | Nishihara |
| 2002/0023249 | A1 | 2/2002 | Temullo et al. |
| 2002/0024700 | A1 | 2/2002 | Yokoyama et al. |
| 2002/0027686 | A1 | 3/2002 | Wada et al. |
| 2002/0063924 | A1 | 5/2002 | Kimbrough et al. |
| 2002/0109878 | A1 | 8/2002 | Qiao |
| 2002/0118419 | A1 | 8/2002 | Zheng et al. |
| 2002/0126337 | A1 | 9/2002 | Uematsu et al. |
| 2002/0141400 | A1 | 10/2002 | DeMartino |
| 2002/0150099 | A1 | 10/2002 | Pung et al. |
| 2002/0154360 | A1 * | 10/2002 | Liu ............................ 359/135 |
| 2002/0159114 | A1 | 10/2002 | Sahasrabuddhe et al. |
| 2002/0186433 | A1 | 12/2002 | Mishra |
| 2002/0186695 | A1 | 12/2002 | Schwartz et al. |
| 2002/0196808 | A1 | 12/2002 | Karri et al. |
| 2003/0002499 | A1 | 1/2003 | Cummings et al. |
| 2003/0009582 | A1 | 1/2003 | Qiao et al. |
| 2003/0016411 | A1 | 1/2003 | Zhou et al. |
| 2003/0031198 | A1 | 2/2003 | Currivan et al. |
| 2003/0037297 | A1 | 2/2003 | Araki |
| 2003/0039007 | A1 | 2/2003 | Ramadas et al. |
| 2003/0043430 | A1 | 3/2003 | Handelman |
| 2003/0048506 | A1 | 3/2003 | Handelman |
| 2003/0053475 | A1 | 3/2003 | Veeraraghavan et al. |
| 2003/0067880 | A1 | 4/2003 | Chiruvolu |
| 2003/0009924 | A1 | 5/2003 | Oh et al. |
| 2003/0120799 | A1 | 6/2003 | Lahav et al. |
| 2003/0189933 | A1 | 10/2003 | Ozugur et al. |
| 2003/0198471 | A1 | 10/2003 | Ovadia |
| 2003/0214979 | A1 | 11/2003 | Kang et al. |
| 2004/0004966 | A1 | 1/2004 | Foster et al. |
| 2004/0052525 | A1 | 3/2004 | Ovadia |
| 2004/0062263 | A1 | 4/2004 | Charcranoon et al. |
| 2004/0120261 | A1 | 6/2004 | Ovadia |
| 2004/0131061 | A1 | 7/2004 | Matsuoka et al. |
| 2004/0156325 | A1 | 8/2004 | Perkins et al. |
| 2004/0156390 | A1 | 8/2004 | Prasad et al. |
| 2004/0170165 | A1 | 9/2004 | Maciocco et al. |
| 2004/0170431 | A1 | 9/2004 | Maciocco et al. |
| 2004/0208171 | A1 | 10/2004 | Ovadia et al. |
| 2004/0208172 | A1 | 10/2004 | Ovadia et al. |
| 2004/0208544 | A1 | 10/2004 | Ovadia |
| 2004/0208554 | A1 | 10/2004 | Wakai et al. |
| 2004/0234263 | A1 | 11/2004 | Ovadia et al. |
| 2004/0252995 | A1 | 12/2004 | Ovadia et al. |
| 2004/0258407 | A1 | 12/2004 | Maciocco et al. |
| 2004/0264960 | A1 | 12/2004 | Maciocco et al. |
| 2005/0030951 | A1 | 2/2005 | Maciocco et al. |
| 2005/0063701 | A1 | 3/2005 | Ovadia et al. |
| 2005/0068968 | A1 | 3/2005 | Ovadia et al. |
| 2005/0068995 | A1 | 3/2005 | Lahav et al. |
| 2005/0089327 | A1 | 4/2005 | Ovadia et al. |
| 2005/0105905 | A1 | 5/2005 | Ovadia et al. |
| 2005/0152349 | A1 | 7/2005 | Takeuchi et al. |
| 2005/0175183 | A1 | 8/2005 | Ovadia et al. |
| 2005/0175341 | A1 | 8/2005 | Ovadia |
| 2005/0177749 | A1 | 8/2005 | Ovadia |
| 2005/0259571 | A1 | 11/2005 | Battou |
| 2006/0008273 | A1 | 1/2006 | Xue et al. |

FOREIGN PATENT DOCUMENTS

| | | |
|---|---|---|
| CN | 1406000 | 3/2003 |
| CN | 1426189 | 6/2003 |
| EP | 0876076 A2 | 11/1998 |
| EP | 1 073 306 A | 1/2001 |
| EP | 1 073 307 A | 1/2001 |
| EP | 1089498 A2 | 4/2001 |
| EP | 1 122 971 A | 8/2001 |
| EP | 1135000 A1 | 9/2001 |
| EP | 1217862 A2 | 6/2002 |
| EP | 1303111 A2 | 4/2003 |
| EP | 1 351 458 A | 10/2003 |
| WO | WO 01/19006 A1 | 3/2001 |
| WO | WO 01/67694 A1 | 9/2001 |
| WO | WO 01/76160 A1 | 10/2001 |
| WO | WO 01/86998 A1 | 11/2001 |
| WO | WO 02/41663 A2 | 5/2002 |
| WO | WO 02/067505 A1 | 8/2002 |
| WO | PCT/US2004/002830 | 7/2004 |

OTHER PUBLICATIONS

Qiao, C., "Labeled Optical Burst Switching for IP-over-WDM Integration," IEEE Communications Magazine, (Sep. 2000), pp. 104-114.

Chaskar, H., et al., "Robust Trasnport of IP Traffic Over WDM Using Optical Burst Switching," Optical Networks Magazine, (Jul./Aug. 2002), pp. 47-60.

Oh, Se-Yoon et al., "A Data Burst Assembly Algorithm in Optical Burst Switching Networks," ETRI Journal, Aug. 2002, pp. 311-322, vol. 24, No. 4, Electronics and Telecommunications Research Institute, Tejon, Korea.

IETF Networking Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.

Liu, Hang et al., "GMPLS-Based Control Plane for Optical Networks: Early Implementation Experience," Proceedings of the SPIE, Jul. 29, 2002, pp. 220-229, vol. 4872, SPIE, Bellingham, VA, US.

U.S. Appl. No. 10/377,312, Office Action dated Aug. 22, 2006.

Greg Bernstein et al., "OIF UNI 1.0—Controlling Optical Networks", info@oiforum.com, pp. 1-3.

(ABSTRACT), "MPLS Technologies for IP Networking Solution", pp. 1-5.

Gallaher, Rick, "An Introduction to MPLS", Course Director for Global Knowledge and President of Telecommunications Technical Services, Inc., Sep. 10, 2001, pp. 1-7.

"Compare SANs to Alternate Technologies", Brocade, Retrieved on Feb. 26, 2003 from http://www.brocade.com/san/evaluate/compare_san.jsp.

Khattar, Ravi Kumar et al., "Introduction to Storage Area Network, SAN", International Technical Support Organization, Aug. 1999, www.redbooks.ibm.com.

Sahara, A. et al., "Demonstration of Optical Burst Data Switching Using Photonic MPLS Routers Operated by GMPLS Signaling," OFC 2003, vol. 1, pp. 220-222.

Qiao, C. et al., "Polymorphic Control for Cost-Effective Design of Optical Networks", European transactions on Telecommunications, vol. 11, No. 1, Jan.-Feb. 2000, pp. 17-26.

Baldine, I. et al., "Jumpstart: A Just-in-Time Signaling Architecture for WDM Burst-Switched Networks", IEEE Communications Magazine, Feb. 2002, pp. 82-89.

Comellas, J. et al., "Integrated IP/WDM Routing in GMPLS-Based Optical Networks", IEEE Network, Mar./Apr. 2003, pp. 22-27.

Cidon, I. et al., "Connection Establishment in High-Speed Networks", IEEE/ACM Transactions on Networking, No. 4, Aug. 1993, pp. 469-481.

"Generalized Multiprotocol Label Switching (GMPLS)", Copyright © The International Engineering Consortium, Web ProForum Tutorials http://www.iec.org, pp. 1-27.

Floyd, Sally et al., "Modifying TCP's Congestion Control for High Speeds", May 5, 2002, pp. 1-5.

Fredj, S. Ben et al., "Statistical Bandwidth Sharing: A Study of Congestion at Flow Level", France Telecom R&D, pp. 111-122.

Zeljkovic, Nada et al., "A Simulation Analysis of Statistical Multiplexing in Frame Relay and ATM Internetworking", TELESIKS 2001, Sep. 19-21, 2001, Nis, Yugoslavia, pp. 116-119.

Kumaran, Krishnan et al., "Multiplexing Regulated Traffic Streams: Design and Performance", Bell Laboratories/Lucent Technologies, IEEE INFOCOM 2001, pp. 527-536.

Su, C.-F. et al., "On Statistical Multiplexing, Traffic Mixes, and VP Management", University of Texas at Austin, 1998 IEEE.

Brown, Timothy X., "Adaptive Statistical Multiplexing for Broadband Communication", Performance Evaluation and Application of ATM Networks, Kouvatsos, D. editor, Kluwer, 2000, pp. 51-80.

Walch, Philip F., "FEC Standards and Long Haul STM-64 DWDM Transmission," Contribution to T1 Standards Project T1X1.5, Jan. 17-20, 2000, pp. 1-4.

"ITU-T Rec. G.709/Y.1331—Interfaces for the Optical Transport Network (OTN)", International Telecommunication Union, Mar. 2003, pp. 1-109.

Henderson, Michael, "Forward Error Correction in Optical Network," Mar. 27, 2001. http://members.cox.net/michaeo.henderson/Papers/Optical_FEC.pdf, pp. 1-18.

Wei, Wei et al., "GMPLS-Based Hierarchical Optical Routing Switching Architecture", Proceedings of SPIE, vol. 4585, 2001, pp. 328-334.

Banerjee, A. et al., "Generalized Multiprotocol Label Switching: An Overview of Routing and Management Enhancements," IEEE Communications Magazine, Jan. 2001, pp. 144-150.

Kim, Y. et al., "Discrete Event Simulation of the DiffServ-over-MPLS with NIST GMPLS Lightwave Agile Switching Simulator (GLASS)," Joint Conference of Communication and Information—2002, Jeju, Korea, 4 pgs.

Cao, Xiaojun et al., "Assembling TCP/IP Packets in Optical Burst Switched Networks", IEEE Global Telecommunications Conference, 2002, pp. 2808-2812, vol. 1, New York.

Wang, S.Y., "Using TCP Congestion Control to Improve the Performance of Optical Burst Switched Networks", IEEE International Conference on Communications, 2003, pp. 1438-1442, Taiwan.

Detti, Andrea et al., "Impact of Segments Aggregation on TCP Reno Flows in Optical Burst Switching Networks", IEEE Infocom, 2002, pp. 1803-1805, vol. 1, New York.

Ghani, Nasir et al., "On IP-over-WDM Integration", IEEE Communications Magazine, Mar. 2000, pp. 72-84.

Yoo, S.J. Ben, "Optical-label switching, MPLS, MPLambdaS, and GMPLS", Optical Networks Magazine, May/Jun. 2003, pp. 17-31.

Rekhter, Y. et al., "A Border Gateway Protocol 4 (BGP-4)", Network Working Group, Mar. 1995, pp. 1-57.

Office Action mailed on Oct. 18, 2006. Ovadia et al., "Architecture and Method for Framing Control and Data Bursts Over 10 Gbit Ethernet With and Without WAN Interface Sublayer Support", U.S. Appl. No. 10/459,781, filed Jun. 11, 2003.

Office Action mailed on Nov. 14, 2006. Ovadia et al., "Dynamic Route Discovery for Optical Switched Networks," U.S. Appl. No. 10/691,712, filed Oct. 22, 2003.

Office Action mailed on Nov. 15, 2006. Ovadia et al., "Architecture and Method for Framing Optical Control and Data Bursts Within Optical Transport Unit Structures in Photonic Burst-Switched Networks", U.S. Appl. No. 10/441,771, filed May 19, 2003.

Final Office Action mailed on Nov. 22, 2006. Maciocco et al., "Adaptive Framework for Closed-Loop Protocols Over Photonic Burst Switched Networks", U.S. Appl. No. 10/464,969, filed Jun. 18, 2003.

Office Action mailed on Nov. 29, 2006. Ovadia et al., "Architecture, Method and System of Multiple High-Speed Servers to Network in WDM Based Photonic Burst-Switched Networks," U.S. Appl. No. 10/417,823, filed Apr. 16, 2003.

Office Action mailed on Dec. 29, 2006. Ovadia et al., "Modular Reconfigurable Multi-Server System and Method for High-Speed Networking Within Photonic Burst-Switched Networks," U.S. Appl. No. 10/418,487, filed Apr. 17, 2003.

Office Action mailed on Jan. 3, 2007. Ovadia et al., "Method and System to Recover Resources in the Event of Data Burst Loss Within WDM-Based Optical-Switched Networks," U.S. Appl. No. 10/668,874, filed Sep. 23, 2003.

Office Action mailed on Jan. 10, 2007. Maciocco et al., "Generic Multi-Protocol Label Switching (GMPLS) Signaling Extensions for Optical Switched Networks," U.S. Appl. No. 10/636,062, filed Aug. 6, 2003.

Jacob et al., "Delay Performance of Some Scheduling Strategies in an Input Queuing ATM with Multiclass Bursty Traffic," IEEE/ACM Transactions on Networking, vol. 4, No. 2, Apr. 1996, pp. 258-271.

Yoo et al., "Optical Burst Switching for Service differentiation in the Next-Generation Optical Internet," IEEE, Feb. 2001, pp. 98-104.

Guillemot et al., "Transparent Optical Packet Switching: The European ACTS KEOPS Project Approach," IEEE 1998, Journal of Lightwave Technology, vol. 16, No. 12, Dec. 1998, pp. 2117-2126.

Gambini et al., "Transparent Optical Packet Switching: Network Architecture and Demonstrators in the KEOPS Project," IEEE Journal of Selected Areas in Communications, vol. 16, No. 7, Sep. 1998, pp. 1245-1259.

Mehorta, Pronita, et al., "Network Processor Design for Optical Burst Switched Networks," Proceedings of the 14th Annual IEEE International ASIC/SOC Conference, Sep. 12-15, 2001, pp. 296-300.

Ovadia, Shlomo et al., "Photonic Burst Switching (PBS) Architecture for Hop and Span-Constrained Optical Networks," IEEE Optical Communications, vol. 41, No. 11, Nov. 2003, pp. S24-S32.

Office Action mailed on Jan. 12, 2007. U.S. Appl. No. 10/242,839, filed Sep. 13, 2002, Ovadia et al.

Office Action mailed on Mar. 21, 2007. U.S. Appl. No. 10/713,585, filed Nov. 13, 2002, Ovadia et al.

Final Office Action mailed on Jan. 17, 2007. U.S. Appl. No. 10/606,323, filed Jun. 24, 2003, Maciocco et al.

Final Office Action mailed on Feb. 9, 2007. U.S. Appl. No. 10/373,312, filed Feb. 28, 2003, Maciocco et al.

Mike J. O'Mahony, et al., "The Application of Optical Packet Switching in Future Communication Networks," IEEE Communications Magazine, Mar. 2001.

Shun Yao, et all.., "All-Optical Packet Switching for Metropolitan Area Networks: Opportunities and Challenges," IEEE Communications Magazine, Mar. 2001.

Chunming Qiao, "Labeled Optical Burst Switching for IP-over-WDM Integration," IEEE Communications Magazine, Sep. 2000.

A. Carena et all., "OPERA: An Optical Packet Experimental Routing Architecture with Label Swapping Capability," Journal of Lightwave Technology, vol. 16, No. 12, Dec. 1998.

Wen De Zhong, "A New Wavelength-Routed Photonic Packet Buffer Combining Traveling Delay Lines with Delay-Line Loops," Journal of Lightwave Technology, vol. 19, No. 8, Aug. 2001.

Kenneth O. Hill, et all., "Fiber Bragg Grating Technology Fundamentals and Overview", Journal of Lightwave Technology, vol. 15, No. 8, Aug. 1997.

Turan Erdogan, "Fiber Grating Spectra," Journal of Lightwave Technology, vol. 15, No. 8, Aug. 1997.

K. Sugden, et al., "Fabrication and Characterization of Bandpass Filters Based on Concatenated Chirped Faber Gratings," Journal of Lightwave Technology, vol. 15, No. 8, Aug. 1997.

C.R. Giles, "Lightwave Applications of Fiber Bragg Gratings," Journal of Lightwave Technology, vol. 15, No. 8, Aug. 1997.

A. E. Willner, et al., "Tunable Compensation of Channel Degrading Effects Using Nonlinearly Chirped Passive Fiber Bragg Gratings," IEE Journal of Selected Topics in Quantum Electronics, vol. 5, No. 5 Sep./Oct. 1999.

P.V. Studenkov, et al., "Asymmetric Twin-Wavelength 1/55—μm Wavelength Laser with a Distributed Bragg Reflector," IEEE Photonics Technology Letters, vol. 12, No. 5, May 2000.

Yasou Shibata, et al., "Coupling Coefficient Modulation of Waveguide Grating Using Sampled Grating," IEEE Photonics Technology Letters, vol. 6, No. 10, Oct. 1994.

D. Wiesmann, et al., "Apodized Surface-Corrugated Gratings with Varying Duty Cycles," IEEE Photonics Technology Letters, vol. 12, No. 6, Jun. 2000.

* cited by examiner

OPTICAL DATA BURST FORMAT

OPTICAL CONTROL BURST FORMAT

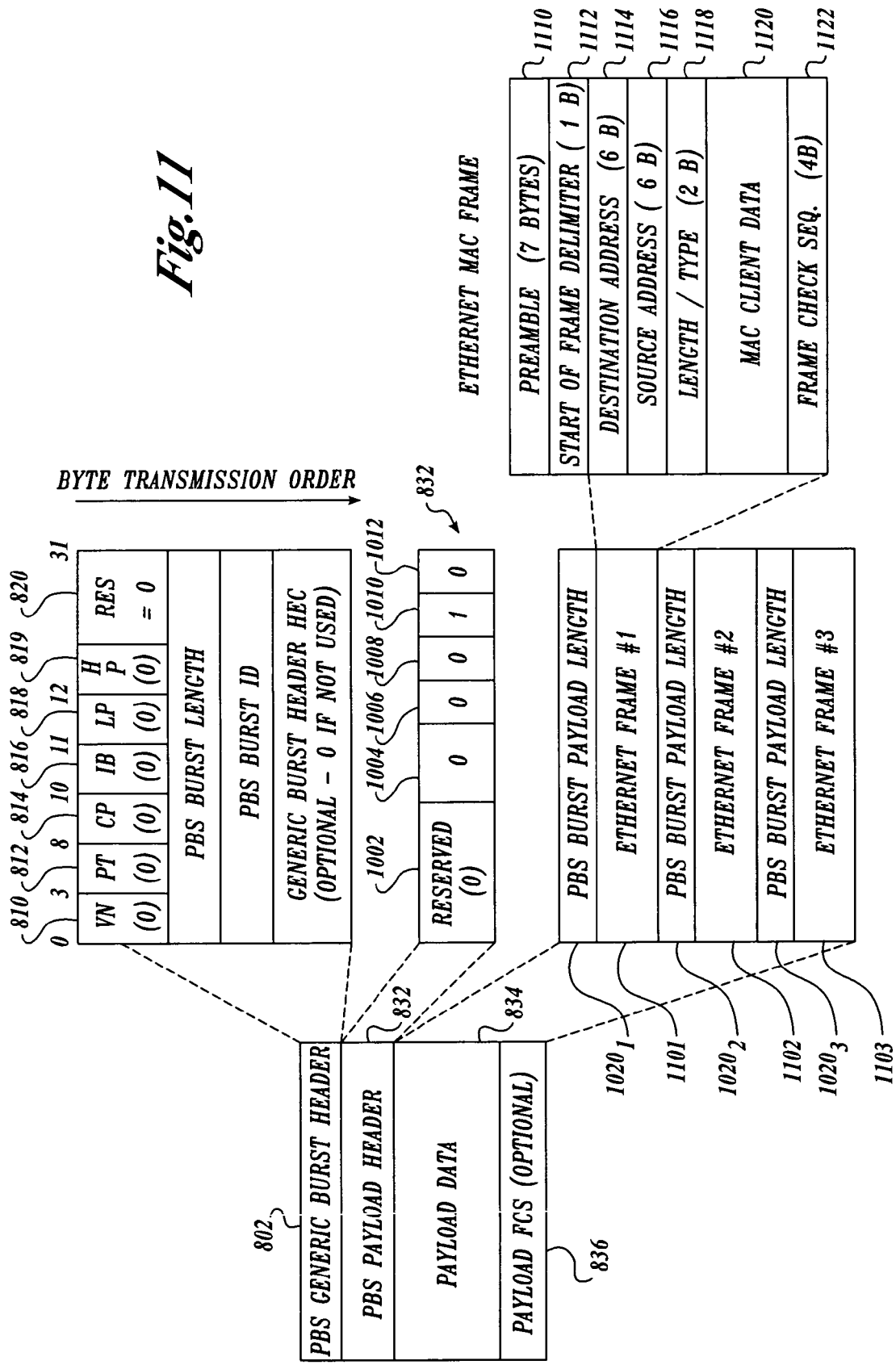

METHOD AND SYSTEM TO FRAME AND FORMAT OPTICAL CONTROL AND DATA BURSTS IN WDM-BASED PHOTONIC BURST SWITCHED NETWORKS

CROSS REFERENCE TO RELATED APPLICATIONS

The present application is related to U.S. patent application Ser. No. 10/126,091, filed Apr. 17, 2002, U.S. patent application Ser. No. 10/183,111, filed Jun. 25, 2002, U.S. patent application Ser. No. 10/328,571, filed Dec. 24, 2002, and co-filed U.S. patent application Ser. No. 10/377,312.

FIELD OF THE INVENTION

An embodiment of the present invention relates to optical networks in general; and, more specifically, to formatting and framing of optical control and data bursts in photonic burst switched networks.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology is used to support the ever-growing demand in optical networks for higher data rates.

Conventional optical switched networks typically use wavelength routing techniques, which require that optical-electrical-optical (O-E-O) conversion of optical signals be done at the optical switches. O-E-O conversion at each switching node in the optical network is not only very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large communication network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). The optical MANs and WANs typically require a higher bandwidth than local-area networks (LANs) in order to provide an adequate level of service demanded by their high-end users. However, as LAN speeds/bandwidth increase with improved technology, there is a need for increasing MAN/WAN speeds/bandwidth.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 11 is a diagram illustrating framing of multiple Ethernet frames in a PBS optical data burst, according to one embodiment of the present invention.

DETAILED DESCRIPTION OF PREFERRED EMBODIMENTS

Figure 1:
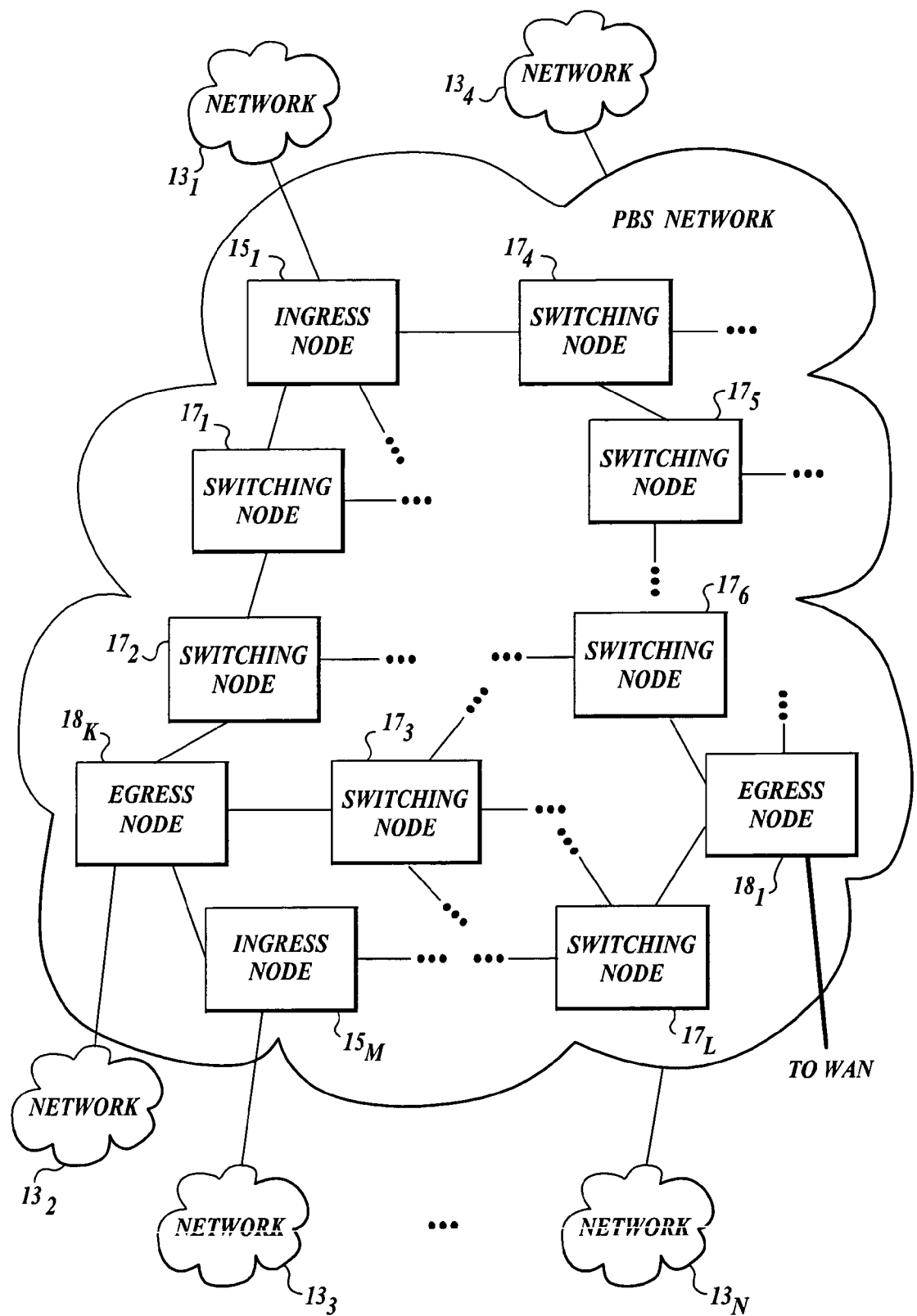
FIG. 1 is a simplified block diagram illustrating a photonic burst-switched (PBS) network with variable time slot provisioning, according to one embodiment of the present invention.

FIG. 1 illustrates a photonic burst-switched (PBS) network 10, according to one embodiment of the present invention. The term photonic burst is used herein to refer to statistically-multiplexed packets (e.g., Internet protocol (IP) packets or Ethernet frames) having similar routing requirements). A photonic burst typically includes a photonic label containing the header and other routing information of the IP packets and a payload containing the data segments of the packets.

This embodiment of PBS network 10 includes local area networks (LANs) $13_1$-$13_N$ and a backbone optical WAN (not shown). In addition, this embodiment of PBS network 10 includes ingress nodes $15_1$-$15_M$, switching nodes $17_1$-$17_L$, and egress nodes $18_1$-$18_K$. PBS network 10 can include other ingress, egress and switching nodes (not shown) that are interconnected with the switching nodes shown in FIG. 1. The ingress and egress nodes are also referred to herein as edge nodes in that they logically reside at the edge of the PBS network. The edge nodes, in effect, provide an interface between the aforementioned "external" networks (i.e., external to the PBS network) and the switching nodes of the PBS network. In this embodiment, the ingress, egress and switching nodes are implemented with intelligent modules. This embodiment can be used, for example, as a metropolitan area network connecting a large number of LANs within the metropolitan area to a large optical backbone network.

In some embodiments, the ingress nodes perform optical-electrical (O-E) conversion of received optical signals, and include electronic memory to buffer the received signals until they are sent to the appropriate LAN. In addition, in some embodiments, the ingress nodes also perform electrical-optical (E-O) conversion of the received electrical signals before they are transmitted to switching nodes $17_1$-$17_M$ of PBS network 10.

Egress nodes are implemented with optical switching units or modules that are configured to receive optical signals from other nodes of PBS network 10 and route them to the optical WAN or other external networks. Egress nodes can also receive optical signals from the optical WAN or other external network and send them to the appropriate node of PBS network 10. In one embodiment, egress node $18_1$ performs O-E-O conversion of received optical signals, and includes electronic memory to buffer received signals until they are sent to the appropriate node of PBS network 10 (or to the optical WAN).

Switching nodes $17_1$-$17_L$ are implemented with optical switching units or modules that are each configured to receive optical signals from other switching nodes and appropriately route the received optical signals to other switching nodes of PBS network 10. As is described below, the switching nodes perform O-E-O conversion of optical control bursts and network management control burst signals. In some embodiments, these optical control bursts and network management control bursts are propagated only on preselected wavelengths. The preselected wavelengths do not propagate optical "data" bursts (as opposed to control bursts and network management control bursts) signals in such embodiments, even though the control bursts and network management control bursts may include necessary information for a particular group of optical data burst signals. The control and data information is transmitted on separate wavelengths in some embodiments (also referred to herein as out-of-band signaling). In other embodiments, control and data information may be sent on the same wavelengths (also referred to herein as in-band signaling). In another embodiment, optical control bursts, network management control bursts, and optical data burst signals may be propagated on the same wavelength(s) using different encoding schemes such as different modulation formats, etc. In either approach, the optical control bursts and network management control bursts are sent asynchronously relative to its corresponding optical data burst signals. In still another embodiment, the optical control bursts and other control signals are propagated at different transmission rates as the optical data signals.

Although switching nodes $17_1$-$17_L$ may perform O-E-O conversion of the optical control signals, in this embodiment, the switching nodes do not perform O-E-O conversion of the optical data burst signals. Rather, switching nodes $17_1$-$17_L$ perform purely optical switching of the optical data burst signals. Thus, the switching nodes can include electronic circuitry to store and process the incoming optical control bursts and network management control bursts that were converted to an electronic form and use this information to configure photonic burst switch settings, and to properly route the optical data burst signals corresponding to the optical control bursts. The new control bursts, which replace the previous control bursts based on the new routing information, are converted to an optical control signal, and it is transmitted to the next switching or egress nodes. Embodiments of the switching nodes are described further below.

Elements of exemplary PBS network 10 are interconnected as follows. LANs $13_1$-$13_N$ are connected to corresponding ones of ingress nodes $15_1$-$15_M$. Within PBS network 10, ingress nodes $15_1$-$15_M$ and egress nodes $18_1$-$18_K$ are connected to some of switching nodes $17_1$-$17_L$ via optical fibers. Switching nodes $17_1$-$17_L$ are also interconnected to each other via optical fibers in mesh architecture to form a relatively large number of lightpaths or optical links between the ingress nodes, and between ingress nodes $15_1$-$15_L$ and egress nodes $18_1$-$18_K$. Ideally, there are more than one lightpath to connect the switching nodes $17_1$-$17_L$ to each of the endpoints of PBS network 10 (i.e., the ingress nodes and egress nodes are endpoints within PBS network 10). Multiple lightpaths between switching nodes, ingress nodes, and egress nodes enable protection switching when one or more node fails, or can enable features such as primary and secondary route to destination.

As described below in conjunction with FIG. 2, the ingress, egress and switching nodes of PBS network 10 are configured to send and/or receive optical control bursts, optical data burst, and other control signals that are wavelength multiplexed so as to propagate the optical control bursts and control labels on pre-selected wavelength(s) and optical data burst or payloads on different preselected wavelength(s). Still further, the edge nodes of PBS network 10 can send optical control burst signals while sending data out of PBS network 10 (either optical or electrical).

Figure 2:
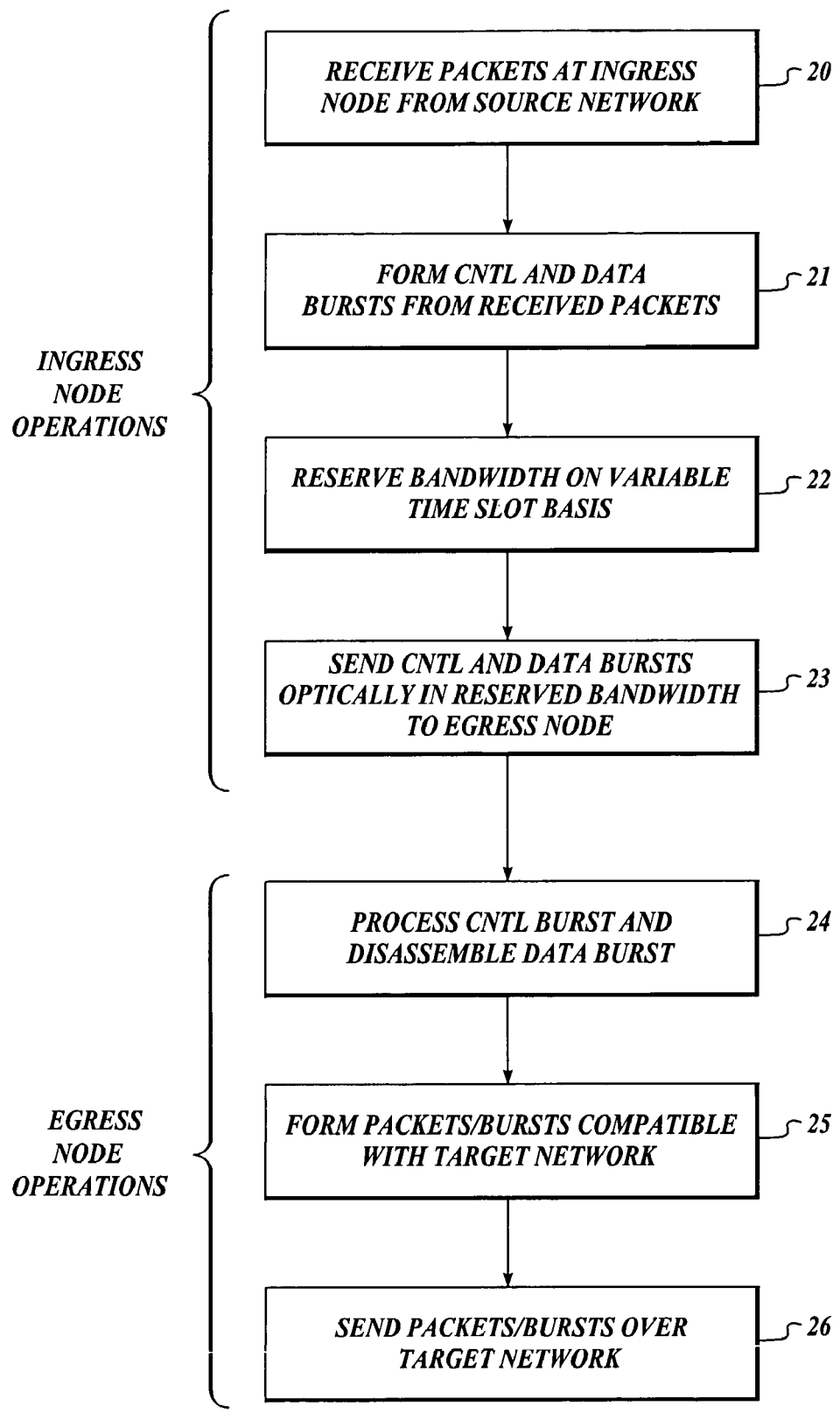
FIG. 2 is a simplified flow diagram illustrating the operation of a photonic burst-switched (PBS) network, according to one embodiment of the present invention.

FIG. 2 illustrates the operational flow of PBS network 10, according to one embodiment of the present invention. Referring to FIGS. 1 and 2, photonic burst switching network 10 operates as follows.

PBS network 10 receives packets from LANs $13_1$-$13_N$. In one embodiment, PBS network 10 receives IP packets at ingress nodes $15_1$-$15_M$. The received packets can be in electronic form rather than in optical form, or received in optical form and then converted to electronic form. In this embodiment, the ingress nodes store the received packets electronically. A block 20 represents this operation.

For clarity, the rest of the description of the operational flow of PBS network 10 focuses on the transport of information from ingress node $15_1$ to egress node $18_1$. The transport of information from ingress nodes $15_2$-$15_M$ to egress node $18_1$ (or other egress nodes) is substantially similar.

An optical burst label (i.e., an optical control burst) and optical payload (i.e., an optical data burst) is formed from the received packets. In one embodiment, ingress node $15_1$ uses statistical multiplexing techniques to form the optical data burst from the received IP (Internet Protocol) packets stored in ingress node $15_1$. For example, packets received by ingress node $15_1$ and having to pass through egress node $18_1$ on their paths to a destination can be assembled into an optical data burst payload. A block 21 represents this operation.

Bandwidth on a specific optical channel and/or fiber is reserved to transport the optical data burst through PBS network 10. In one embodiment, ingress node $15_1$ reserves a time slot (i.e., a time slot of a TDM system) in an optical data signal path through PBS network 10. This time slot maybe fixed-time duration and/or variable-time duration with either uniform or non-uniform timing gaps between adjacent time slots. Further, in one embodiment, the bandwidth is reserved for a time period sufficient to transport the optical burst from the ingress node to the egress node. For example, in some embodiments, the ingress, egress, and switching nodes maintain an updated list of all used and available time slots. The time slots can be allocated and distributed over multiple wavelengths and optical fibers. Thus, a reserved time slot (also referred to herein as a TDM channel), that in different embodiments may be of fixed-duration or variable-duration, may be in one wavelength of one fiber, and/or can be spread across multiple wavelengths and multiple optical fibers. A block 22 represents this operation.

When an ingress and/or egress node reserves bandwidth or when bandwidth is released after an optical data burst is transported, a network controller (not shown) updates the list. In one embodiment, the network controller and the ingress or egress nodes perform this updating process using various burst or packet scheduling algorithms based on the available network resources and traffic patterns. The available variable-duration TDM channels, which are periodically broadcasted to all the ingress, switching, and egress nodes, are transmitted on the same wavelength as the optical control bursts or on a different common preselected wavelength throughout the optical network. The network controller function can reside in one of the ingress or egress nodes, or can be distributed across two or more ingress and/or egress nodes. In this embodiment, the network controller is part of control unit 37 (FIG. 3), which can include one or more processors.

The optical control bursts, network management control labels, and optical data bursts are then transported through photonic burst switching network 10 in the reserved time slot or TDM channel. In one embodiment, ingress node $15_1$ transmits the control burst to the next node along the optical label-switched path (OLSP) determined by the network controller. In this embodiment, the network controller uses a constraint-based routing protocol [e.g., multi-protocol label switching (MPLS)] over one or more wavelengths to determine the best available OLSP to the egress node.

In one embodiment, the control label (also referred to herein as a control burst) is transmitted asynchronously ahead of the photonic data burst and on a different wavelength and/or different fiber. The time offset between the control burst and the data burst allows each of the switching nodes to process the label and configure the photonic burst switches to appropriately switch before the arrival of the corresponding data burst. The term photonic burst switch is used herein to refer to fast optical switches that do not use O-E-O conversion.

In one embodiment, ingress node $15_1$ then asynchronously transmits the optical data bursts to the switching nodes where the optical data bursts experience little or no time delay and no O-E-O conversion within each of the switching nodes. The optical control burst is always sent before the corresponding optical data burst is transmitted.

In some embodiments, the switching node may perform O-E-O conversion of the control bursts so that the node can extract and process the routing information contained in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format. The optical burst is transmitted from one switching node to another switching node in a similar manner until the optical control and data bursts are terminated at egress node $18_1$. A block 23 represents this operation.

The operational flow at this point depends on whether the target network is an optical WAN or a LAN. A block 24 represents this branch in the operational flow.

If the target network is an optical WAN, new optical label and payload signals are formed. In this embodiment, egress node $18_1$ prepares the new optical label and payload signals. A block 25 represents this operation.

The new optical label and payload are then transmitted to the target network (i.e., WAN in this case). In this embodiment, egress node $18_1$ includes an optical interface to transmit the optical label and payload to the optical WAN. A block 26 represents this operation.

However, if in block 24 the target network is a LAN, the optical data burst is disassembled to extract the IP packets or Ethernet frames. In this embodiment, egress node $18_1$ converts the optical data burst to electronic signals that egress node $18_1$ can process to recover the data segment of each of the packets. A block 27 represents this operation.

The extracted IP data packets or Ethernet frames are processed, combined with the corresponding IP labels, and then routed to the target network (i.e., LAN in this case). In this embodiment, egress node $18_1$ forms these new IP packets. A block 28 represents this operation. The new IP packets are then transmitted to the target network (i.e., LAN) as shown in block 26.

PBS network 10 can achieve increased bandwidth efficiency through the additional flexibility afforded by the TDM channels. Although this exemplary embodiment described above includes an optical MAN having ingress, switching and egress nodes to couple multiple LANs to an optical WAN backbone, in other embodiments the networks do not have to be LANs, optical MANs or WAN backbones. That is, PBS network 10 may include a number of relatively small networks that are coupled to a relatively larger network that in turn is coupled to a backbone network.

Figure 3:
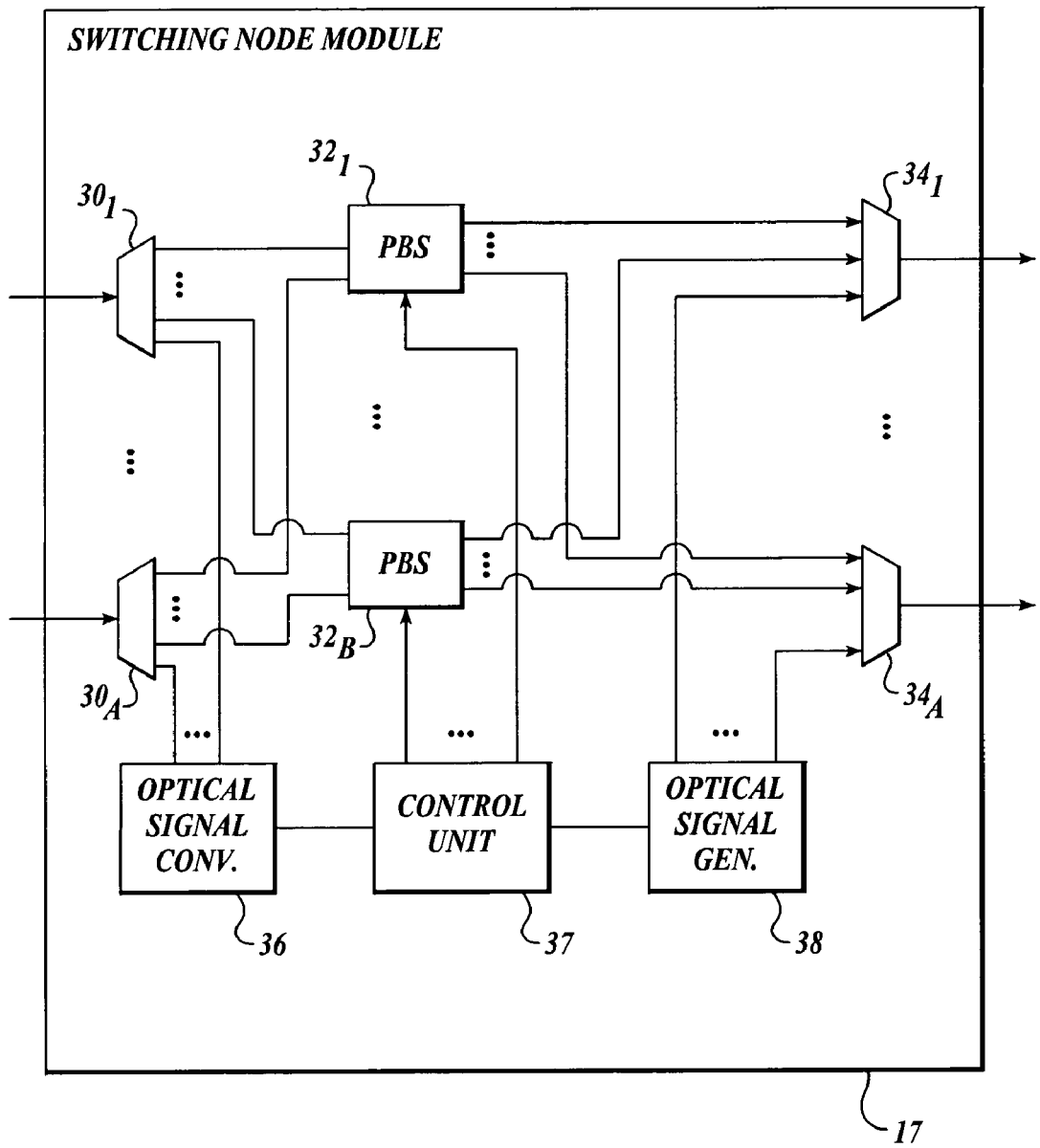
FIG. 3 is a block diagram illustrating a switching node module for use in a photonic burst-switched (PBS) network, according to one embodiment of the present invention.

FIG. 3 illustrates a module 17 for use as a switching node in photonic burst switching network 10 (FIG. 1), according to one embodiment of the present invention. In this embodiment, module 17 includes a set of optical wavelength division demultiplexers $30_1$-$30_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A·C, where N≧A·C+1. For embodiments in which N is greater than A·C, the extra input/output ports can be used to loop back an optical signal for buffering.

Further, although photonic burst switches $32_1$-$32_B$ are shown as separate units, they can be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control unit 37, and a set of electrical-to-optical signal converters 38 (e.g., lasers). Control unit 37 may have one or more processors to execute software or firmware programs.

Figure 10:
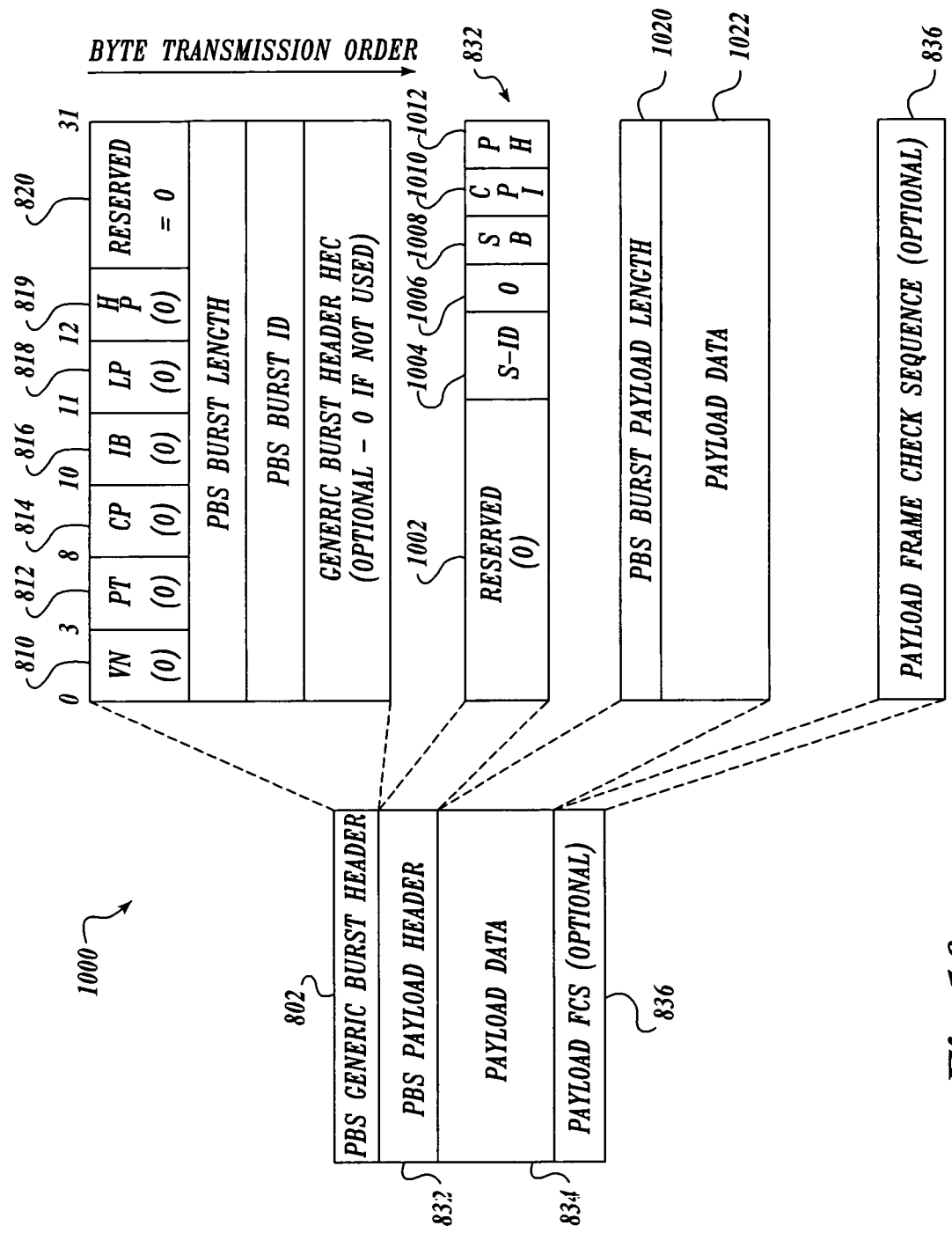
FIG. 10 is a diagram illustrating a PBS optical data burst framing format, according to one embodiment of the present invention.

The elements of this embodiment of module 17 are interconnected as follows. Optical demultiplexers $30_1$-$30_A$ are connected to a set of A input optical fibers that propagate input optical signals from other switching nodes of photonic burst switching network 10 (FIG. 10). The output leads of the optical demultiplexers are connected to the set of B core optical switches $32_1$-$32_B$ and to optical signal converter 36. For example, optical demultiplexer $30_1$ has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch $32_1$ has A output leads connected to input leads of optical multiplexers $34_1$-$34_A$ (i.e., one output lead of photonic burst switch $32_1$ to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38. As described below in conjunction with the flow diagram of FIG. 5, module 17 is used to receive and transmit optical control bursts, optical data bursts, and network management control bursts. In one embodiment, the optical data bursts and optical control bursts have transmission formats as shown in FIGS. 4A and 4B.

Figure 4A:
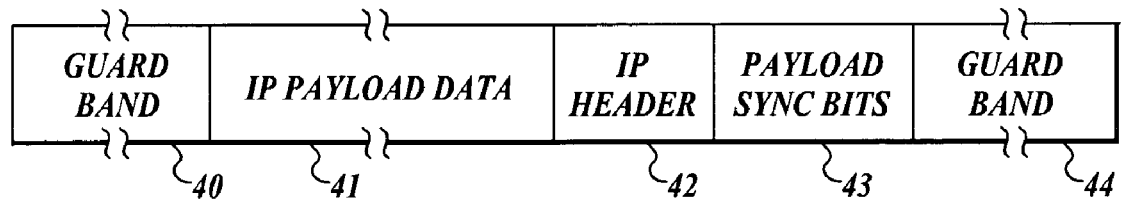
FIGS. 4A and 4B are diagram illustrating the format of an optical data burst and an optical control burst for use in a photonic burst-switched network, according to one embodiment of the present invention.

FIG. 4A illustrates the format of an optical data burst for use in PBS network 10 (FIG. 1), according to one embodiment of the present invention. In this embodiment, each optical data burst has a start guard band 40, an IP payload data segment 41, an IP header segment 42, a payload sync segment 43 (typically a small number of bits), and an end guard band 44 as shown in FIG. 4A. In some embodiments, IP payload data segment 41 includes the statistically-multiplexed IP data packets or Ethernet frames used to form the burst. Although FIG. 4A shows the payload as contiguous, module 17 transmits payloads in a TDM format. Further, in some embodiments the data burst can be segmented over multiple TDM channels. It should be pointed out that in this embodiment the optical data bursts and optical control bursts have local significance only in PBS network 10, and may loose their significance at the optical WAN.

Figure 4B:
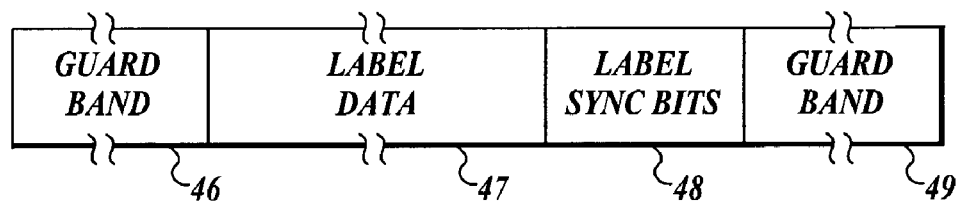

FIG. 4B illustrates the format of an optical control burst for use in photonic burst switching network 10 (FIG. 1), according to one embodiment of the present invention. In this embodiment, each optical control burst has a start guard band 46, an IP label data segment 47, a label sync segment 48 (typically a small number of bits), and an end guard band 49 as shown in FIG. 4B. In this embodiment, label data segment 45 contains all the necessary routing and timing information of the IP packets to form the optical burst. Although FIG. 4B shows the payload as contiguous, in this embodiment module 17 transmits labels in a TDM format.

In some embodiments, an optical network management control label (not shown) is also used in PBS network 10 (FIG. 1). In such embodiments, each optical network management control burst includes: a start guard band similar to start guard band 46; a network management data segment similar to data segment 47; a network management sync segment (typically a small number of bits) similar to label sync segment 48; and an end guard band similar to end guard band 44. In this embodiment, network management data segment contains network management information needed to coordinate transmissions over the network. In some embodiments, the optical network management control burst is transmitted in a TDM format.

Figure 5:
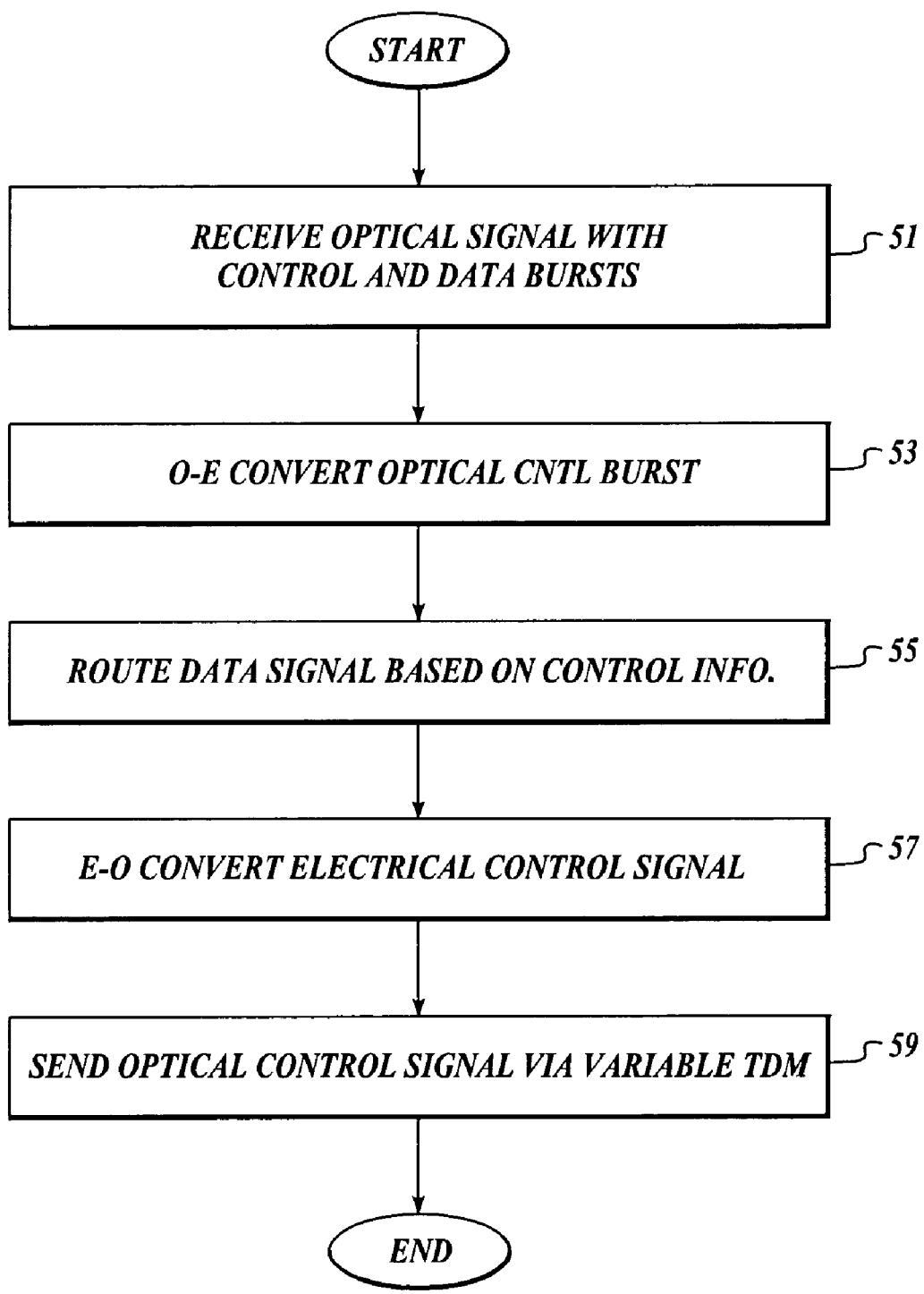
FIG. 5 is a flow diagram illustrating the operation of a switching node module, according to one embodiment of the present invention.

FIG. 5 illustrates the operational flow of module 17 (FIG. 3), according to one embodiment of the present invention. Referring to FIGS. 3 and 5, module 17 operates as follows.

Module 17 receives an optical signal with TDM label and data signals. In this embodiment, module 17 receives an optical control signal (e.g., an optical control burst) and an optical data signal (i.e., an optical data burst in this embodiment) at one or two of the optical demultiplexers. For example, the optical control signal may be modulated on a first wavelength of an optical signal received by optical demultiplexer $30_A$, while the optical data signal is modulated on a second wavelength of the optical signal received by optical demultiplexer $30_A$. In some embodiments, the optical control signal may be received by a first optical demultiplexer while the optical data signal is received by a second optical demultiplexer. Further, in some cases, only an optical control signal (e.g., a network management control burst) is received. A block 51 represents this operation.

Module 17 converts the optical control signal into an electrical signal. In this embodiment, the optical control signal is the optical control burst signal, which is separated from the received optical data signal by the optical demultiplexer and sent to optical-to-electrical signal converter 36. In other embodiments, the optical control signal can be a network management control burst (previously described in conjunction with FIG. 4B). Optical-to-electrical signal converter 36 converts the optical control signal into an electrical signal. For example, in one embodiment each portion of the TDM control signal is converted to an electrical signal. The electrical control signals received by control unit 37 are processed to form a new control signal. In this embodiment, control unit 37 stores and processes the information contained in the control signals. A block 53 represents this operation.

Module 17 then routes the optical data signals (i.e., optical data burst in this embodiment) to one of optical multiplexers $34_1$-$34_A$, based on routing information contained in the control signal. In this embodiment, control unit 37 processes the control burst to extract the routing and timing information and sends appropriate PBS configuration signals to the set of B photonic burst switches $32_1$-$32_B$ to re-configure each of the photonic burst switches to switch the corresponding optical data bursts. A block 55 represents this operation.

Module 17 then converts the processed electrical control signal to a new optical control burst. In this embodiment, control unit 37 provides TDM channel alignment so that reconverted or new optical control bursts are generated in the desired wavelength and TDM time slot pattern. The new control burst may be modulated on a wavelength and/or time slot different from the wavelength and/or time slot of the control burst received in block 51. A block 57 represents this operation.

Module 17 then sends the optical control burst to the next switching node in the route. In this embodiment, electrical-to-optical signal generator 38 sends the new optical control burst to appropriate optical multiplexer of optical multiplexers $34_1$-$34_A$ to achieve the route. A block 59 represents this operation.

Figure 6:
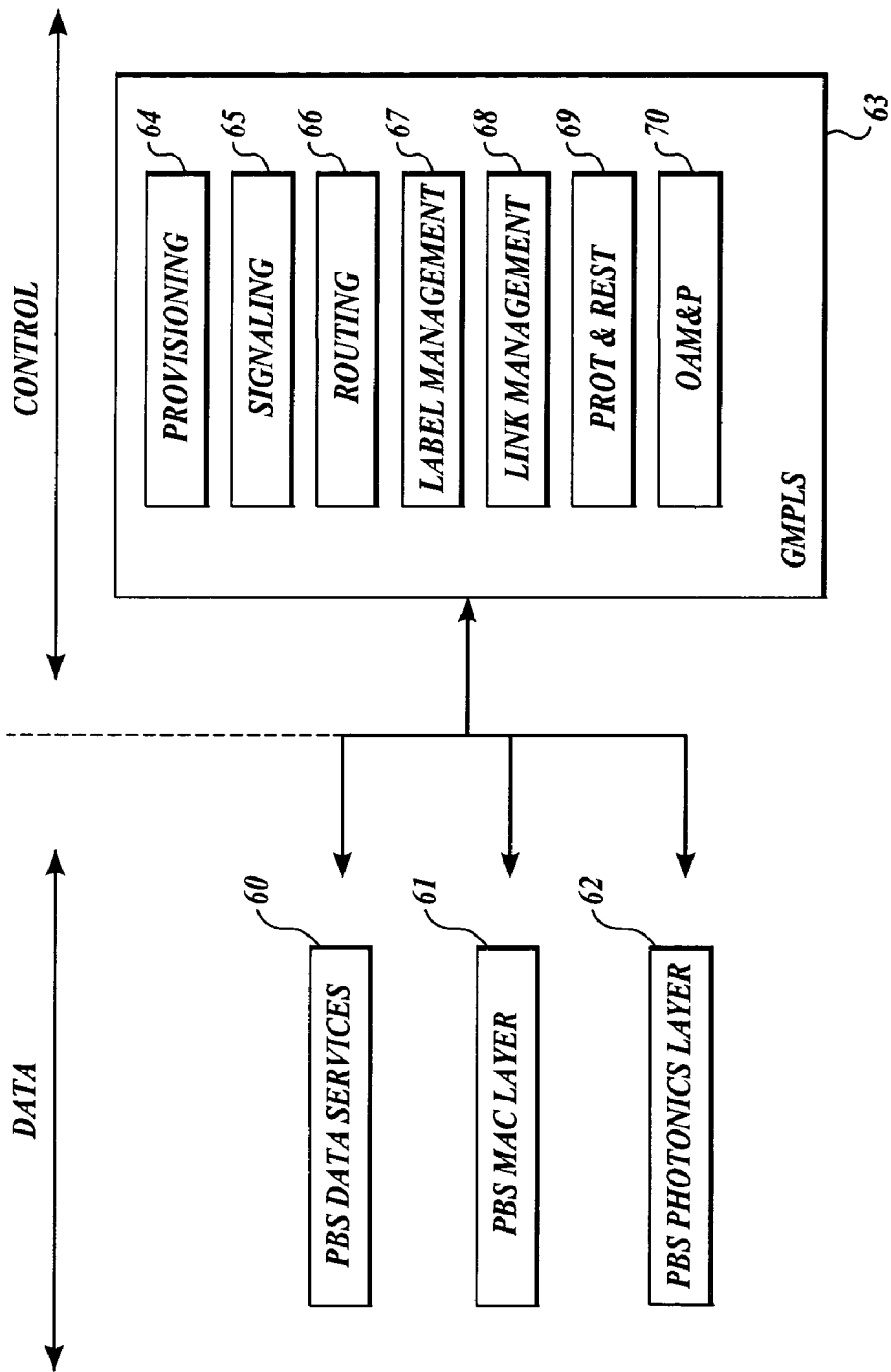
FIG. 6 is a diagram illustrating a generalized multi-protocol label switching (GMPLS)-based architecture for a PBS network, according to one embodiment of the present invention.

FIG. 6 illustrates a GMPLS-based architecture for a PBS network, according to one embodiment of the present invention. Starting with the GMPLS suite of protocols, each of the GMPLS protocols can be modified or extended to support PBS operations and optical interfaces while still incorporating the GMPLS protocols' various traffic-engineering tasks. The integrated PBS layer architecture include PBS data services layer 60 on top of a PBS MAC layer 61, which is on top of a PBS photonics layer 62. It is well known that the GMPLS suite (indicated by a block 63 in FIG. 6) includes a provisioning component 64, a signaling component 65, a routing component 66, a label management component 67, a link management component 68, and a protection and restoration component 69. In some embodiments, these components are modified or have added extensions that support the PBS layers 60-62. Further, in this embodiment, GMPLS suite 63 is also extended to include an operation, administration, management and provisioning (OAM&P) component 70.

For example, signaling component 65 can include extensions specific to PBS networks such as, for example, burst start time, burst type, burst length, and burst priority, etc. Link management component 68 can be implemented based on the well known link management protocol (LMP) (that currently supports only SONET/SDH networks), with extensions added to support PBS networks. Protection and restoration component 69 can, for example, be modified to cover PBS networks.

Further, for example, label management component 67 can be modified to support a PBS control channel label space. In one embodiment, the label operations are performed after control channel signals are O-E converted. The ingress nodes of the PBS network act as label edge routers (LERs) while the switching nodes act as label switch routers (LSRs). An egress node acts as an egress LER substantially continuously providing all of the labels of the PBS network. This component can advantageously increase the speed of control channel context retrieval (by performing a pre-established label look-up instead of having to recover a full context).

Figure 7:
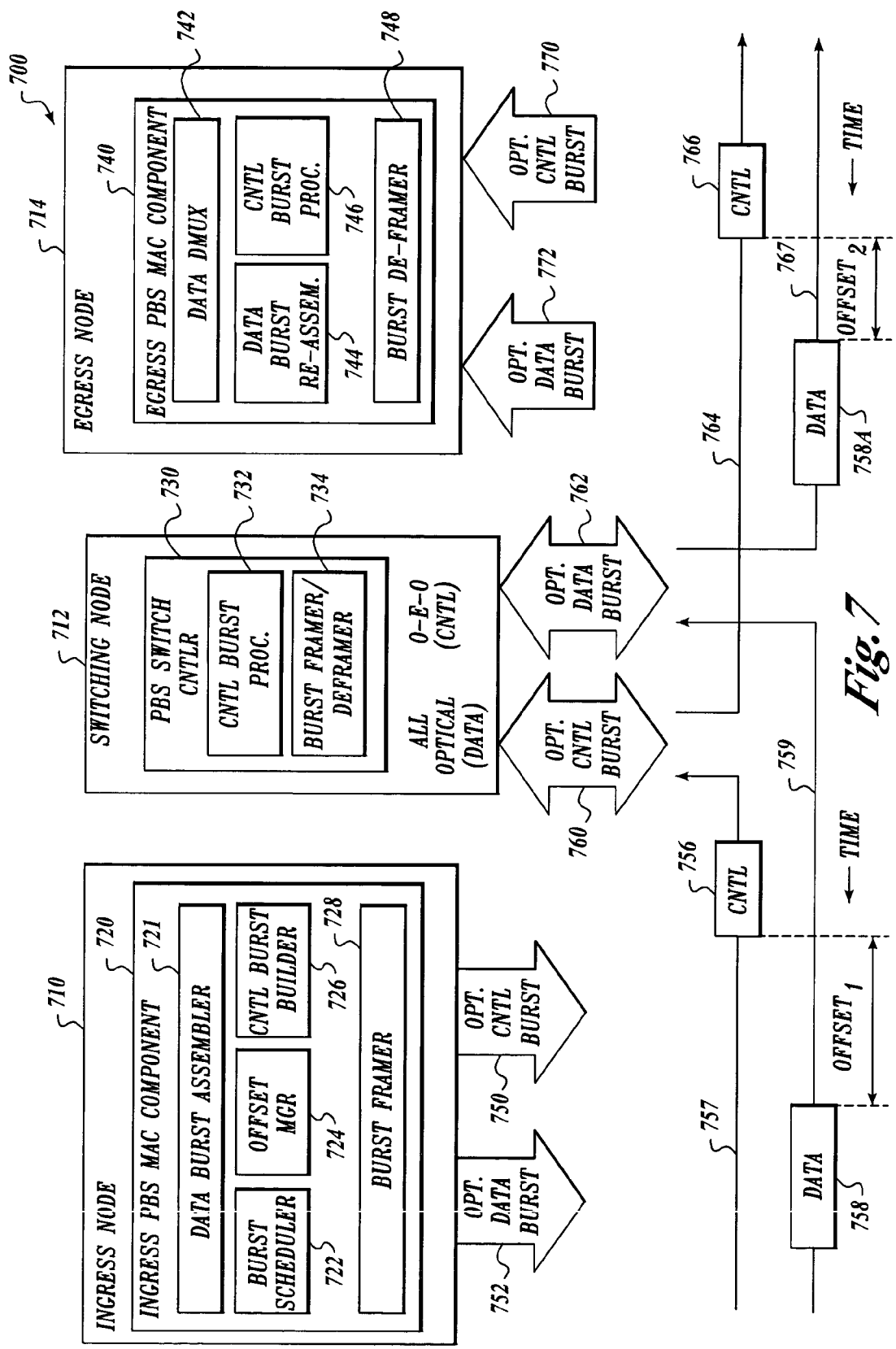
FIG. 7 is a diagram illustrating PBS optical burst flow between nodes in a PBS network, according to one embodiment of the present invention.

FIG. 7 illustrates PBS optical burst flow between nodes in an exemplary PBS network 700, according to one embodiment of the present invention. System 700 includes ingress node 710, a switching node 712, an egress node 714 and other nodes (egress, switching, and ingress that are not shown to avoid obscuring the description of the optical burst flow). In this embodiment, the illustrated components of ingress, switching and egress nodes 710, 712 and 714 are implemented using machine-readable instructions that cause a machine (e.g., a processor) to perform operations that allow the nodes to transfer information to and from other nodes in the PBS network. In this example, the lightpath for the optical burst flow is from ingress node 710, to switching node 712 and then to egress node 714.

Ingress node 710 includes an ingress PBS MAC layer component 720 having a data burst assembler 721, a data burst scheduler 722, an offset time manager 724, a control burst builder 726 and a burst framer 728. In one embodiment, data burst assembler 721 assembles the data bursts to be optically transmitted over PBS network 10 (FIG. 1). In one embodiment, the size of the data burst is determined based on many different network parameters such as quality-of-service (QoS), number of available optical channels, the size of electronic buffering at the ingress nodes, the specific burst assembly algorithm, etc.

Data burst scheduler 722, in this embodiment, schedules the data burst transmission over PBS network 10 (FIG. 1). In this embodiment, ingress PBS MAC layer component 710 generates a bandwidth request for insertion into the control burst associated with the data burst being formed. In one embodiment, data burst scheduler 722 also generates the schedule to include an offset time (from offset manager 724 described below) to allow for the various nodes in PBS network 10 to process the control burst before the associated data burst arrives.

In one embodiment, offset time manager 724 determines the offset time based on various network parameters such as, for example, the number of hops along the selected lightpath, the processing delay at each switching node, traffic loads for specific lightpaths, and class of service requirements.

Then control burst builder 726, in this embodiment, builds the control burst using information such as the required bandwidth, burst scheduling time, in-band or out-of-band signaling, burst destination address, data burst length, data burst channel wavelength, offset time, priorities, and the like.

Burst framer 728 frames the control and data bursts (using the framing format described below in conjunction with FIGS. 7-10 in some embodiments). Burst framer 728 then transmits the control burst over PBS network 10 via a physical optical interface (not shown), as indicated by an arrow 750. In this embodiment, the control burst is transmitted out of band (OOB) to switching node 712, as indicated by an optical control burst 756 and PBS TDM channel 757 in FIG. 7. Burst framer 728 then transmits the data burst according to the schedule generated by burst scheduler 722 to switching node 712 over the PBS network via the physical optical interface, as indicated by an optical burst 758 and PBS TDM channel 759 in FIG. 7. The time delay between optical bursts 756 (control burst) and 758 (data burst) in indicated as an OFFSET$_1$ in FIG. 7.

Switching node 712 includes a PBS switch controller 730 that has a control burst processing component 732, a burst framer/de-framer 734 and a hardware PBS switch (not shown).

In this example, optical control burst 756 is received via a physical optical interface (not shown) and optical switch (not shown) and converted to electrical signals (i.e., O-E conversion). Control burst framer/de-framer 734 de-frames the control burst information and provides the control information to control burst processing component 732. Control burst processing component 732 processes the information, determining the corresponding data burst's destination, bandwidth reservation, next control hop, control label swapping, etc.

PBS switch controller component 730 uses some of this information to control and configure the optical switch (not shown) to switch the optical data burst at the appropriate time duration to the next node (i.e., egress node 714 in this example) at the proper channel. In some embodiments, if the reserved bandwidth is not available, PBS switch controller component 730 can take appropriate action. For example, in one embodiment PBS switch controller 730 can: (a) determine a different lightpath to avoid the unavailable optical channel (e.g., deflection routing); (b) delay the data bursts using integrated buffering elements within the PBS switch fabric such as fiber delay lines; (c) use a different optical channel (e.g. by using tunable wavelength converters); and/or (d) drop only the coetaneous data bursts. Some embodiments of PBS switch controller component 730 may also send a negative acknowledgment message back to ingress node 710 to re-transmit the dropped burst.

However, if the bandwidth can be found and reserved for the data burst, PBS switch controller component 730 provides appropriate control of the hardware PBS switch (not shown). In addition, PBS switch controller component 730 generates a new control burst based on the updated reserved bandwidth from control burst processing component 732 and the available PBS network resources. Control burst framer/de-framer 734 then frames the re-built control burst, which is then optically transmitted to egress node 714 via the physical optical interface (not shown) and the optical switch (not shown), as indicated by PBS TDM channel 764 and an optical control burst 766 in FIG. 7.

Subsequently, when the optical data burst corresponding to the received/processed control burst is received by switching node 712, the hardware PBS switch is already configured to switch the optical data burst to egress node 714. In other situations, switching node 712 can switch the optical data burst to a different node (e.g., another switching node not shown in FIG. 7). The optical data burst from ingress node 710 is then switched to egress node 714, as indicated by PBS TDM channel 767 and an optical data burst 758A. In this embodiment, optical data burst 758A is simply optical data burst 758 re-routed by the hardware PBS switch (not shown), but possibly transmitted in a different TDM channel. The time delay between optical control burst 766 and optical data burst 758A is indicated by an OFFSET$_2$ in FIG. 7, which is smaller than OFFSET$_1$ due, for example, to processing delay and other timing errors in switching node 712.

Egress node 714 includes a PBS MAC component 740 that has a data demultiplexer 742, a data burst re-assembler 744, a control burst processing component 746, and a data burst de-framer 748.

Egress node 714 receives the optical control burst as indicated by an arrow 770 in FIG. 7. Burst de-framer 748 receives and de-frames the control burst via a physical O-E interface (not shown). In this embodiment, control burst processing component 746 processes the de-framed control burst to extract the pertinent control/address information.

After the control burst is received, egress node 714 receives the data burst(s) corresponding to the received control burst, as indicated by an arrow 772 in FIG. 7. In this example, egress node 714 receives the optical data burst after a delay of OFFSET$_2$, relative to the end of the control burst. In a manner similar to that described above for received control bursts, burst de-framer 748 receives and de-frames the data burst. Data burst re-assembler 744 then processes the de-framed data burst to extract the data (and to re-assemble the data if the data burst was a fragmented data burst). Data de-multiplexer 742 then appropriately de-multiplexes the extracted data for transmission to the appropriate destination (which can be a network other than the PBS network).

Figure 8:
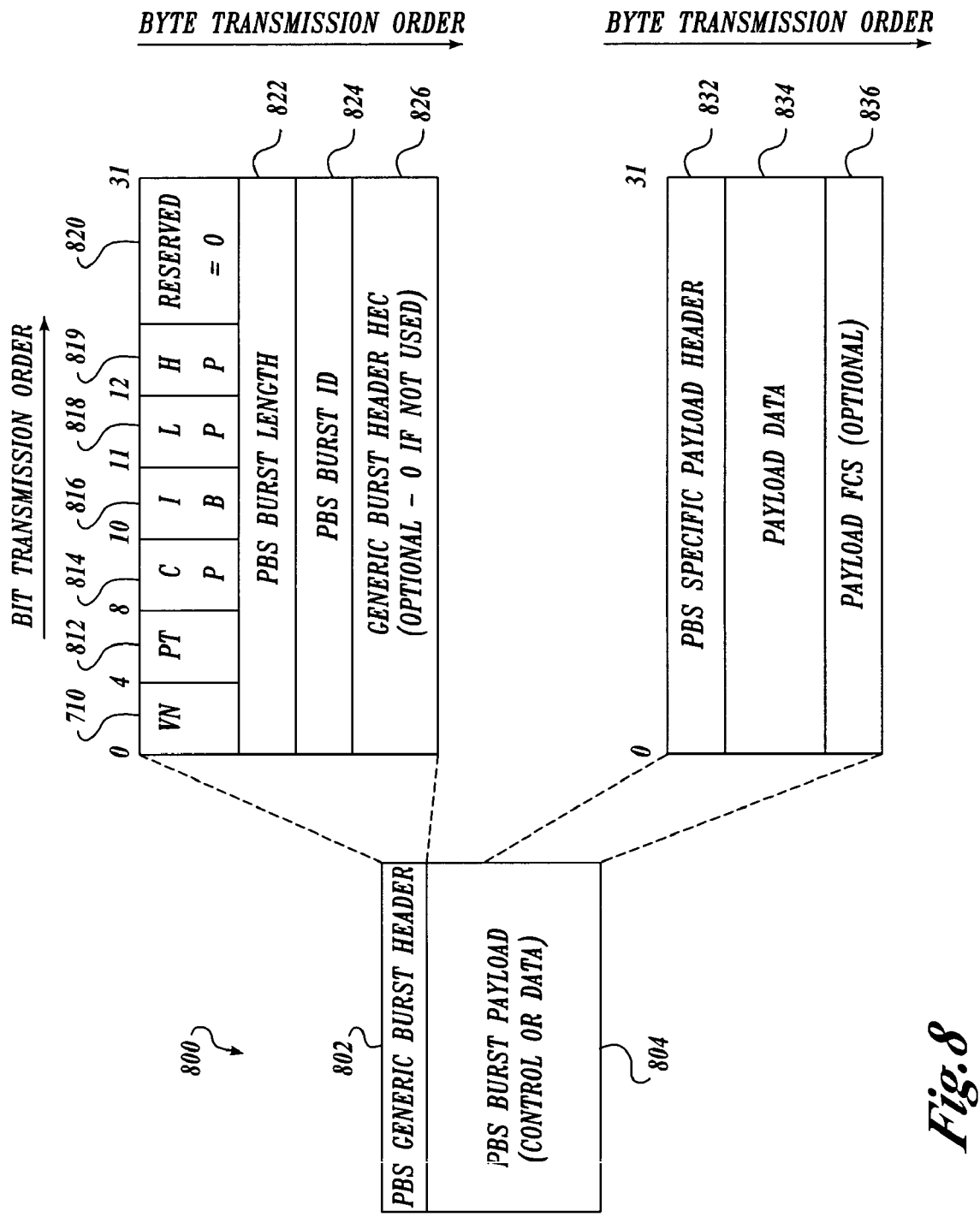
FIG. 8 is a diagram illustrating generic PBS framing format for PBS optical bursts, according to one embodiment of the present invention.

FIG. 8 illustrates a generic PBS framing format 800 for PBS optical bursts, according to one embodiment of the present invention. Generic PBS frame 800 includes a PBS generic burst header 802 and a PBS burst payload 804 (which can be either a control burst or a data burst). FIG. 8 also includes an expanded view of PBS generic burst header 802 and PBS burst payload 804.

PBS generic burst header 802 is common for all types of PBS bursts and includes a version number (VN) field 810, a payload type (PT) field 812, a control priority (CP) field 814, an in-band signaling (IB) field 816, a label present (LP) field 818, a header error correction (HEC) present (HP) field 819, a burst length field 822, and a burst ID field 824. In some embodiments, PBS generic burst header also includes a reserved field 820 and a HEC field 826. Specific field sizes and definitions are described below for framing format having 32-bit words; however, in other embodiments, the sizes, order and definitions can be different.

In this embodiment, PBS generic burst header 802 is a 4-word header. The first header word includes VN field 810, PT field 812, CP field 814, IB field 816 and LP field 818. VN field 810 in this exemplary embodiment is a 4-bit field (e.g., bits 0-3) defining the version number of the PBS Framing format being used to frame the PBS burst. In this embodiment, VN field 810 is defined as the first 4-bits of the first word, but in other embodiments, it need not be the first 4-bits, in the first word, or limited to 4-bits.

PT field 812 is a 4-bit field (bits 4-7) that defines the payload type. For example, binary "0000" may indicate that the PBS burst is a data burst, while binary "0001" indicates that the PBS burst is a control burst, and binary "0010" indicates that the PBS burst is a management burst. In this embodiment, PT field 812 is defined as the second 4-bits of the first word, but in other embodiments, it need not be the second 4-bits, in the first word, or limited to 4-bits.

CP field 814 is a 2-bit field (bits 8-9) that defines the burst's priority. For example, binary "00" may indicate a normal priority while binary "01" indicates a high priority. In this embodiment, PT field 812 is defined bits 8 and 9 of the first word, but in other embodiments, it need not be bits 8 and 9, in the first word, or limited to 2-bits.

IB field 816 is a one-bit field (bit 10) that indicates whether the PBS control burst is being signaled in-band or OOB. For example, binary "0" may indicate OOB signaling while binary "1" indicates in-band signaling. In this embodiment, IB field 816 is defined as bit 10 of the first word, but in other embodiments, it need not be bit 10, in the first word, or limited to one-bit.

LP field 818 is a one-bit field (bit 11) used to indicate whether a label has been established for the lightpath carrying this header. In this embodiment, LP field 818 is defined as bit 11 of the first word, but in other embodiments, it need not be bit 11, in the first word, or limited to one-bit.

HP field 819 is a one-bit field (bit 12) used to indicate whether header error correction is being used in this control burst. In this embodiment, HP field 819 is defined as bit 12 of the first word, but in other embodiments, it need not be bit 12, in the first word, or limited to one-bit. The unused bits (bits 13-31) form field(s) 820 that are currently unused and reserved for future use.

The second word in PBS generic burst header 802, in this embodiment, contains PBS burst length field 822, which is used to store a binary value equal to the length the number of bytes in PBS burst payload 804. In this embodiment, the PBS burst length field is 32-bits. In other embodiments, PBS burst length field 822 need not be in the second word and is not limited to 32-bits.

In this embodiment, the third word in PBS generic burst header 802 contains PBS burst ID field 824, which is used to store an identification number for this burst. In this embodiment, PBS burst ID field 824 is 32-bits generated by the ingress node (e.g., ingress node 710 in FIG. 7). In other embodiments, PBS burst ID field 824 need not be in the third word and is not limited to 32-bits.

The fourth word in PBS generic burst header 802, in this embodiment, contains generic burst header HEC field 826, which is used to store an error correction word. In this embodiment, generic burst header HEC field 826 is 32-bits generated using any suitable known error correction technique. In other embodiments, generic burst header HEC field 826 need not be in the fourth word and is not limited to 32-bits. As in indicated in FIG. 8, generic burst header HEC field 826 is optional in that if error correction is not used, the field may be filled with all zeros. In other embodiments, generic burst header HEC field 826 is not included in PBS generic burst header 802.

PBS burst payload 804 is common for all types of PBS bursts and includes a PBS specific payload header field 832, a payload field 834, and a payload frame check sequence (FCS) field 836.

In this exemplary embodiment, PBS specific payload header 832 is the first part (i.e., one or more words) of PBS burst payload 804. Specific payload header field 832 for a control burst is described below in more detail in conjunction with FIG. 9. Similarly, specific payload field 832 for a data burst is described below in conjunction with FIG. 9. Typically, specific payload header field 832 includes one or more fields for information related to a data burst, which can be either this burst itself or contained in another burst associated with this burst (i.e., when this burst is a control burst).

Payload data field 834, in this embodiment, is the next portion of PBS burst payload 804. In some embodiments, control bursts have no payload data, so this field may be omitted or contain all zeros. For data bursts, payload data field 834 may be relatively large (e.g., containing multiple IP packets or Ethernet frames).

Payload FCS field 836, in this embodiment, in the next portion of PBS burst payload. In this embodiment, payload FCS field 836 is a one-word field (i.e., 32-bits) used in error detection and/or correction. As in indicated in FIG. 8, payload FCS field 836 is optional in that if error detection/correction is not used, the field may be filled with all zeros. In other embodiments, payload FCS field 836 is not included in PBS burst payload 804.

Figure 9:
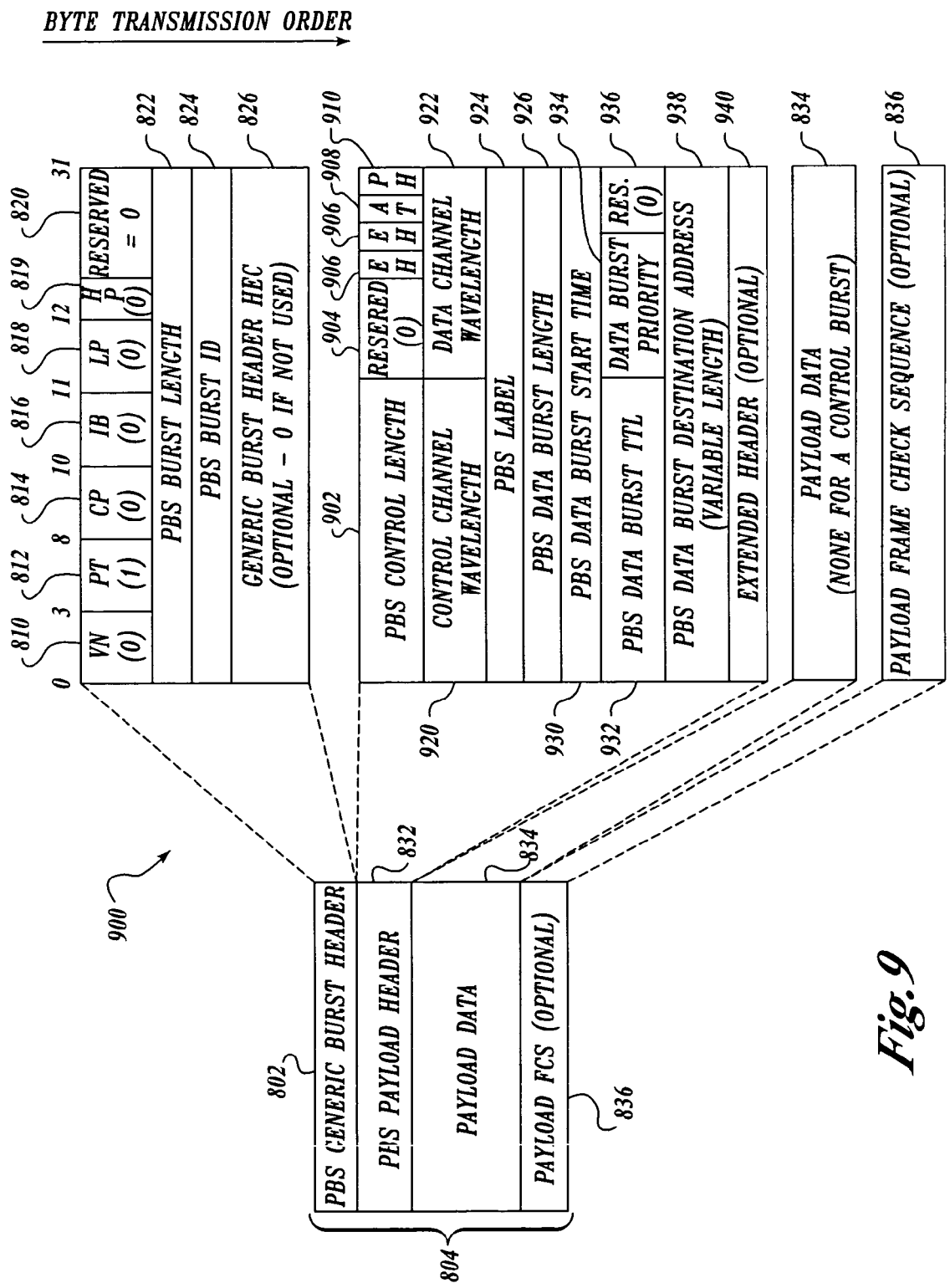
FIG. 9 is a diagram illustrating a PBS optical control burst framing format, according to one embodiment of the present invention.

FIG. 9 illustrates a PBS optical control burst framing format 900, according to one embodiment of the present invention. To help improve clarity, FIG. 9 includes the expanded views of PBS generic burst header 802 and PBS burst payload 804 (previously described in conjunction with FIG. 8), with a further expansion of PBS payload header field 832 (described below) when part of a control burst. In this example, the PT field is set to "01" to indicate that the burst is a control burst. The CP field is set to "0" to indicate that the burst has normal priority. The IB field is set to "0" to indicate that the burst is using OOB signaling. The LP field is set to "0" to indicate that there is no label for this control burst.

In this exemplary embodiment of a PBS control burst, PBS payload header field 832 includes: a PBS control length field 902; an extended header (EH) field 906; an address type (AT) field 908; a payload FCS present (PH) field 910; a control channel wavelength field 920; a data channel wavelength field 922; a PBS label field 924; a PBS data burst length field 926; a PBS data burst start time field 930; a PBS data burst time-to-live (TTL) field 932; a data burst priority field 934; a PBS data burst destination address field 938; and an optional extended header field 940.

In this embodiment, the first word of PBS payload header 832 includes PBS control length field 902, which is used for storing the length of the control header in bytes. In this embodiment, PBS control length field 902 is a 16-bit field (bits 0-15) calculated by control burst builder 726 (FIG. 7) or control burst processor 732 (FIG. 7). In other embodiments, PBS control length field 902 need not be the first 16-bits, in the first word, or limited to 16-bits. A reserved field 904 (bits 16-27) is included in PBS payload header 832 in this embodiment. In other embodiments, these bits may be used for other field(s).

The first word of PBS payload header 832 also includes EH field 906, which is used in this embodiment to indicate whether an extended header is present in the burst. In this embodiment, EH field 906 is a 1-bit field (bit 28). In other embodiments, EH field 906 need not be bit 28, or in the first word.

The first word of PBS payload header 832 also includes AT field 908, which is used in this embodiment to indicate the address type of the associated PBS data burst's destination. For example, the address type may be an IP address (e.g., IPv4, IPv6), a network service access point (NSAP) address, an Ethernet address or other type of address. In this embodiment, AT field 908 is a 2-bit field (bits 29-30). In other embodiments, AT field 908 need not be bits 17-18, in the first word, or limited to 2-bits.

In this embodiment, the first word of PBS payload header 832 also includes PH field 910, which is used to indicate whether a payload FCS is present in the burst. In this embodiment, PH field 910 is a 1-bit field (bit 31). In other embodiments, EH field 906 need not be bit 16, or in the first word.

The second word of PBS payload header 832, in this embodiment, includes control channel wavelength field 920, which is used to indicate a WDM wavelength in which the control burst is supposed to be modulated. In this embodiment, control channel wavelength field 920 is a 16-bit field (bits 0-15). In other embodiments, control channel wavelength field 920 need not be bits 0-15, in the second word, or limited to 16-bits.

In this embodiment, the second word of PBS payload header 832 also includes data channel wavelength field 922, which is used to indicate a WDM wavelength in which the data burst is to be modulated. In this embodiment, data channel wavelength field 922 is a 16-bit field (bits 16-31). In other embodiments, data channel wavelength field 922 need not be bits 16-31, in the second word, or limited to 16-bits.

A third word of PBS payload header 832 includes PBS label field 924, which is used in this embodiment to store the label (if any) for the lightpath being used by the burst. In this embodiment, the label is a 32-bit word generated by label management component 67 (FIG. 6). In other embodiments, PBS label field 924 need not be the third word, or limited to 32-bits.

A fourth word of PBS payload header 832 includes PBS data burst length field 926. In this embodiment, the PBS data burst length is a 32-bit word. In other embodiments, PBS data burst length field 926 need not be the fourth word, or limited to 32-bits.

A fifth word of PBS payload header 832 includes PBS data burst start time field 930. In this embodiment, the PBS data burst start time is a 32-bit word, generated by burst scheduler 722 (FIG. 7). In other embodiments, PBS data burst start time field 930 need not be the fifth word, or limited to 32-bits.

A sixth word of PBS payload header 832 includes PBS data TTL field 932. In this embodiment, PBS data TTL field 732 is a 16-bit (bits 0-15) field, generated by ingress PBS MAC component 720 (FIG. 7). For example, in one embodiment, burst scheduler 722 (FIG. 7) of ingress PBS MAC component 720 can generate the TTL value. In other embodiments, PBS data TTL field 932 need not be bits 0-15, in the sixth word, or limited to 16-bits.

The sixth word of PBS payload header 832 also includes data burst priority field 932. In this embodiment, data burst priority field 932 is an 8-bit field (bits 16-23), generated by ingress PBS MAC component 720 (FIG. 7). For example, in one embodiment, burst scheduler 722 (FIG. 7) of ingress PBS MAC component 720 can generate the data burst priority value. In other embodiments, data burst priority field 932 need not be bits 16-23, in the sixth word, or limited to 8-bits. Further, in this embodiment, the sixth word of PBS payload header 832 includes a reserved field 936 (bits 24-31) which can be used in the future for other field(s).

A seventh word of PBS payload header 832 also includes PBS data burst destination address field 938. In this embodiment, PBS data burst destination address field 938 is variable length field, shown as a single 32-bit word for clarity. In other embodiments, PBS data burst destination address field 938 need not be limited to 32-bits. The actual length of the address may vary, depending on the address type as indicated in AT field 908.

An eight word of PBS payload header 832 can include extended header field 940. This header can be used to hold other header data that may be used in the future. When this header is used, EH field 906 is set. In this embodiment, payload data field 834 and payload FCS field 836 have been described above.

FIG. 10 illustrates a PBS optical data burst framing format 1000, according to one embodiment of the present invention. To help improve clarity, FIG. 10 includes the expanded views of PBS generic burst header 802 and PBS burst payload 804 (previously described in conjunction with FIG. 8), with a further expansion of PBS payload header field 832 (described below) and PBS payload data field 834, when part of a data burst. In this example, the PT field is set to "0" to indicate that the burst is a data burst. The CP field is set to "0" to indicate that the burst has normal priority. The IB field is set to "0" to indicate that the burst is using OOB signaling. The LP field is set to "0" to indicate that there is no label for this data burst.

In this exemplary embodiment of a PBS data burst, PBS payload header field 832 includes a reserved field 1002 (i.e., 20 bits in this example), a segment ID field 1004, another reserved field 1006 (i.e., 1-bit in this exemplary embodiment), a segmented burst indicator (SB) field 1008, a concatenated payload indicator (CPI) field 1010 and a payload FCS present field 1012.

In this embodiment of a PBS data burst, PBS payload header 832 includes segment ID field 1004, which is used for storing an ID for re-assembling a segmented data burst. In this embodiment, segment ID field 1004 is an 8-bit field (bits 20-27) calculated by control burst builder 726 (FIG. 7) or control burst processor 732 (FIG. 7). In other embodiments, segment ID field 1004 need not be bits 20-27, in the first word, or limited to 8-bits.

PBS payload header 832 also includes SB field 1008, CPI field 1010 and PH field 1012. These fields are respectively used to indicate whether: the PBS data burst is segmented; the burst payload is concatenated; and a payload FCS is present. In this embodiment, fields 1008, 1010 and 1012 are 1-bit field (bits 29, 30 and 31, respectively). In other embodiments, these fields may be mapped to different bits, or in words other than the first word of PBS payload header 832. Unlike a PBS payload header for a PBS control burst, this embodiment of a PBS payload header for a data burst has only one 32-bit word. However, the PBS payload header for a PBS data burst in other embodiments may be more than word in length.

In this embodiment of a PBS data burst, PBS payload data field 834 includes a PBS burst payload length field 1020 and a payload data segment 1022, as well as payload FCS field 836. PBS burst payload length field 1020, in one embodiment, is used to contain a binary value representing the length of the payload in bytes. In this embodiment, PBS burst payload length field 1020 is the first 32-bit word of payload data field 834. In other embodiments, the field may be mapped to a different location and/or have a different size. Payload FCS field 836 has been described previously.

FIG. 11 illustrates framing of multiple Ethernet frames in a PBS optical data burst, according to one embodiment of the present invention. To help improve clarity, FIG. 11 includes the expanded views of PBS generic burst header field 802, PBS payload header field 832 (for a PBS data burst), and payload data field 834 (previously described in conjunction with FIGS. 8 and 10), with a further expansion of an Ethernet frame (described below).

In this example, fields of PBS generic burst header 802 are set as follows. PT field is set to "0" to indicate that the burst is a data burst. The CP field is set to "0" to indicate that the burst has normal priority. The IB field is set to "0" to indicate that the burst is using OOB signaling. The LP field is set to "0" to indicate that there is no label for this data burst.

Continuing this example, fields of PBS payload header field 832 are set as follows. SB field 1008 and S-ID field 1004 are set to "0" to indicate that the burst is not segmented and, thus, has no segment ID. CPI field 1010 is set to "1" to indicate that the payload has multiple payloads that need to be concatenated. PH field 1012 is set to "0" to indicate that payload data field 834 (for itself as a whole) does not have a FCS. As will be described below, payload data field 834 may include FCSs for subsections of the payload data field.

Payload data field 834, in this example, has encapsulated three Ethernet frames 1001-1003. In payload data field 834, Ethernet frames 1001-1003 are preceded by PBS burst payload length fields 10201-10203, respectively. As previously described in conjunction with FIG. 10, the PBS burst payload length fields indicate the length of the payload burst in bytes. In this exemplary embodiment, PBS burst payload length field 1020₁ indicates the length of Ethernet frame 1001, and so on.

As is well known, an Ethernet frame (i.e., an Ethernet MAC frame) includes a 7-byte preamble field 1110, a 1-byte start of frame delimiter field 1112, a 6-byte destination address field 1114, a 6-byte source address field 1116, a 2-byte length/type field 1118, a MAC client data field 1120 (with a size defined by the value in length/type field 1118), and a 4-byte FCS field 1122. In addition, Ethernet frames are separated required to be separated by a period of time known as the inter-frame gap (IFG).

In some embodiments, payload data field 834 may include IFG field (not shown) before each Ethernet frame (e.g., frame 1101). In some embodiments, the IFG field is filled with dummy data to emulate the IFG required between Ethernet frames. For example, in one embodiment, the IFG field may be a 12-bytes long field for 10/100 Mb/s & 1/10 Gb/s Ethernet frames. In other embodiments, the egress node (see FIG. 1) may be configured to provide the IFG when the Ethernet data is extracted so that no IFG field is need in payload data field 834.

Embodiments of method and apparatus for implementing a photonic burst switching network are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

Thus, embodiments of this invention may be used as or to support software program executed upon some form of processing core (such as the CPU of a computer or a processor of a module) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

What is claimed is:

1. A system for use in a wavelength-division multiplexed (WDM) photonic burst switched (PBS) network, the system comprising:

a burst framer to format information in a PBS burst frame to be transmitted over the PBS network, the PBS burst frame to include a PBS burst header common to PBS control bursts and PBS data bursts, the PBS burst header having fields to indicate whether:

the PBS burst frame is a PBS control burst;

the PBS control burst is transmitted on a wavelength different from that of an associated PBS data burst; and a label, for use in a generalized multi-protocol label swapping (GMPLS)-based system, has been established for the PBS burst frame.

2. The system of claim 1 wherein the PBS burst header further includes a field to indicate a header error correction (HEC) value and a field to indicate whether the HEC value is present.

3. The system of claim 1 wherein the PBS burst header further includes a field to indicate the priority of the PBS burst.

4. The system of claim 1 wherein the PBS burst header further includes a field to indicate the length of the PBS burst.

5. The system of claim 1 wherein the PBS burst frame further includes a PBS burst payload having a payload header field and a payload data field.

6. The system of claim 5 wherein the payload header field further includes a field to indicate the wavelength of the PBS control burst if the PBS burst frame contains a PBS control burst.

7. The system of claim 5 wherein the payload header field further includes a field to indicate the information's address type.

8. The system of claim 5 wherein the payload header field further includes a field to indicate the wavelength of the associated PBS data burst if the PBS burst frame contains a PBS control burst.

9. The system of claim 5 wherein the payload header field further includes a field to carry the label of the PBS burst frame if the PBS burst frame contains a PBS control burst.

10. The system of claim 5 wherein the payload header field further includes a field to indicate a start time of the associated PBS data burst if the PBS burst frame contains a PBS control burst.

11. The system of claim 5 wherein the payload header field includes a field to indicate whether the payload data field contains data to be concatenated if the PBS burst frame contains a PBS data burst.

12. The systems of claim 5 wherein the payload header field includes a field to indicate whether the payload data field contains segmented data if the PBS burst frame contains a PBS data burst.

13. The system of claim 12 wherein the payload header field further includes a field to indicate the payload data field's segment ID if the PBS data burst contains segmented data.

14. The system of claim 12 wherein the payload header field includes a field to indicate whether the payload data field contains a frame check sequence.

15. A method to communicate information between nodes in a wavelength-division multiplexed (WDM) photonic burst switched (PBS) network, the method comprising:

formatting the information in a PBS burst frame, the PBS burst frame including a PBS burst header common to PBS control bursts and PBS data bursts, the PBS burst header having fields for indicating whether:

the PBS burst frame is a PBS control burst, the control burst is transmitted on a wavelength different from that of an associated PBS data burst, and a label, for use in a generalized multi-protocol label swapping (GMPLS)-based system, has been established for the PBS burst frame; and optically transmitting the PBS burst frame over the PBS network.

16. The method of claim 15 wherein the PBS burst header further includes a field to indicate a header error correction (HEC) value and a field to indicate whether the HEC value is present.

17. The method of claim 15 wherein the PBS burst header further includes a field to indicate the priority of the PBS burst.

18. The method of claim 15 wherein the PBS burst header further includes a field to indicate the length of the PBS burst.

19. The method of claim 15 wherein the PBS burst frame further includes a PBS burst payload having a payload header field and a payload data field.

20. The method of claim 19 wherein the payload header field further includes a field to indicate the wavelength of the PBS control burst if the PBS burst frame contains a PBS control burst.

21. The method of claim 19 wherein the payload header field further includes a field to indicate the information's address type.

22. The method of claim 19 wherein the payload header field further includes a field to indicate the wavelength of the associated PBS data burst if the PBS burst frame contains a PBS control burst.

23. The method of claim 19 wherein the payload header field further includes a field to carry the label of the PBS burst frame if the PBS burst frame contains a PBS control burst.

24. The method of claim 19 wherein the payload header field further includes a field to indicate the start time of the associated PBS data burst if the PBS burst frame contains a PBS control burst.

25. The method of claim 19 wherein the payload header field includes a field to indicate whether the payload data field contains data to be concatenated if the PBS burst frame contains a PBS data burst.

26. The method of claim 19 wherein the payload header field includes a field to indicate whether the payload data field contains segmented data if the PBS burst frame contains a PBS data burst.

27. The method of claim 26 wherein the payload header field further includes a field to indicate the payload data field's segment ID if the PBS data burst contains segmented data.

28. The method of claim 19 wherein the payload header field includes a field to indicate whether the payload data field contains a frame check sequence.

29. A machine-readable medium to provide instructions, which when executed by a machine, cause the machine to perform operations for use in a wavelength-division multiplexed (WDM) photonic burst switched (PBS) network, the operations comprising:

formatting information in a PBS burst frame, the PBS burst frame including a PBS burst header common to PBS control bursts and PBS data bursts, the PBS burst header having fields for indicating whether:

the PBS burst frame is a PBS control burst, the control burst is transmitted on a wavelength different from that of an associated PBS data burst, and a label, for use in a generalized multi-protocol label swapping (GMPLS)-based system, has been established for the PBS burst frame; and optically transmitting the PBS burst frame over the PBS network.

30. The machine-readable medium of claim 29 wherein the PBS burst header further includes a field to indicate a header error correction (HEC) value and a field to indicate whether the HEC value is present.

31. The machine-readable medium of claim 29 wherein the PBS burst header further includes a field to indicate the priority of the PBS burst.

32. The machine-readable medium of claim 29 wherein the PBS burst header further includes a field to indicate the length of the PBS burst.

33. The machine-readable medium of claim 29 wherein the PBS burst frame further includes a PBS burst payload having a payload header field and a payload data field.

34. The machine-readable medium of claim 33 wherein the payload header field further includes a field to indicate the wavelength of the PBS control burst if the PBS burst frame contains a PBS control burst.

35. The machine-readable medium of claim 33 wherein the payload header field further includes a field to indicate the information's address type.

36. The machine-readable medium of claim 33 wherein the payload header field further includes a field to indicate the wavelength of the associated PBS data burst if the PBS burst frame contains a PBS control burst.

37. The machine-readable medium of claim 33 wherein the payload header field further includes a field to carry the label of the PBS burst frame if the PBS burst frame contains a PBS control burst.

38. The machine-readable medium of claim 33 wherein the payload header field further includes a field to indicate the start time of the associated PBS data burst if the PBS burst frame contains a PBS control burst.

39. The machine-readable medium of claim 33 wherein the payload header field includes a field to indicate whether the payload data field contains data to be concatenated if the PBS burst frame contains a PBS data burst.

40. The machine-readable medium of claim 33 wherein the payload header field includes a field to indicate whether the payload data field contains a frame check sequence.

41. The machine-readable medium of claim 33 wherein the payload header field includes a field to indicate whether the payload data field contains segmented data if the PBS burst frame contains a PBS data burst.

42. The machine-readable medium of claim 41 wherein the payload header field further includes a field to indicate the payload data field's segment ID if the PBS data burst contains segmented data.

43. A system comprising:
a first network; and
a photonic burst switched (PBS) network coupled to the first network, the PBS network further comprising a node that includes;
a burst framer to format information in a PBS burst frame to be transmitted over the PBS network, the PBS burst frame to include a PBS burst header common to PBS control bursts and PBS data bursts, the PBS burst header having fields to indicate whether:
the PBS burst frame is a PBS control burst;
the control burst is transmitted on a wavelength different from that of an associated PBS data burst; and
a label, for use in a generalized multi-protocol label swapping (GMPLS)-based system, has been established for the PBS burst frame.

44. The system of claim 43 wherein the PBS burst header further includes a field to indicate a header error correction (HEC) value and a field to indicate whether the HEC value is present.

45. The system of claim 43 wherein the PBS burst header further includes a field to indicate the priority of the PBS burst.

46. The system of claim 43 wherein the PBS burst header further includes a field to indicate the length of the PBS burst.

47. The system of claim 43 wherein the PBS burst frame further includes a PBS burst payload having a payload header field and a payload data field.

48. The system of claim 47 wherein the payload header field further includes a field to indicate the wavelength of the PBS control burst if the PBS burst frame contains a PBS control burst.

49. The system of claim 47 wherein the payload header field further includes a field to indicate the information's address type.

50. The system of claim 47 wherein the payload header field further includes a field to indicate the wavelength of the associated PBS data burst if the PBS burst frame contains a PBS control burst.

51. The system of claim 47 wherein the payload header field further includes a field to carry the label of the PBS burst frame if the PBS burst frame contains a PBS control burst.

52. The system of claim 47 wherein the payload header field further includes a field to indicate a start time of the associated PBS data burst if the PBS burst frame contains a PBS control burst.

53. The system of claim 47 wherein the payload header field includes a field to indicate whether the payload data field contains data to be concatenated if the PBS burst frame contains a PBS data burst.

54. The system of claim 47 wherein the payload header field includes a field to indicate whether the payload data field contains segmented data if the PBS burst frame contains a PBS data burst.

55. The system of claim 47 wherein the payload header field includes a field to indicate whether the payload data field contains a frame check sequence.

56. The system of claim 55 wherein the payload header field further includes a field to indicate the payload data field's segment ID if the PBS data burst contains segmented data.

* * * * *